US011045716B2

(12) United States Patent
Herz et al.

(10) Patent No.: US 11,045,716 B2
(45) Date of Patent: Jun. 29, 2021

(54) BOARD GAME FOR CULTURAL LEARNING THAT INCORPORATES SMART DEVICE WITH SOFTWARE APPLICATION INTO GAME PLAY

(71) Applicants: Tracy Herz, Milton, WV (US); Frederick S. M. Herz, Milton, WV (US)

(72) Inventors: Tracy Herz, Milton, WV (US); Frederick S. M. Herz, Milton, WV (US)

(73) Assignee: Inventship LLC, Warrington, PA (US)

( * ) Notice: Subject to any disclaimer, the term of this patent is extended or adjusted under 35 U.S.C. 154(b) by 0 days.

(21) Appl. No.: 14/646,469

(22) PCT Filed: Mar. 14, 2014

(86) PCT No.: PCT/US2014/027911
§ 371 (c)(1),
(2) Date: May 21, 2015

(87) PCT Pub. No.: WO2014/143793
PCT Pub. Date: Sep. 18, 2014

(65) Prior Publication Data
US 2015/0290531 A1 Oct. 15, 2015

Related U.S. Application Data

(60) Provisional application No. 61/788,584, filed on Mar. 15, 2013.

(51) Int. Cl.
*A63F 3/04* (2006.01)
*A63F 9/18* (2006.01)
(Continued)

(52) U.S. Cl.
CPC ............ *A63F 3/04* (2013.01); *A63F 3/00006* (2013.01); *A63F 3/00088* (2013.01);
(Continued)

(58) Field of Classification Search
CPC ...... A63F 2003/041; A63F 9/18; A63F 9/183; A63F 2009/242; A63F 2009/2457;
(Continued)

(56) References Cited

U.S. PATENT DOCUMENTS 1,402,807 A 1/1922 Tegtmeyer et al.
5,280,914 A 1/1994 Selby et al.
(Continued)

OTHER PUBLICATIONS

Trivial Pursuit: How To Play Triviaul Pursuit; Jan. 30, 2013, Board Games Pub; p. 1-2; http://www.boardgamespub.com/boardgames/trivialpursuit/.*
(Continued)

*Primary Examiner* — Omkar A Deodhar
(74) *Attorney, Agent, or Firm* — Culhane Meadows, PLLC

(57) ABSTRACT

A board game facilitates learning about other cultures by asking the game players to answer questions about different aspects of foreign cultures during the course of game play. The game board is a map of international routes of pilgrims, traders, missionaries, merchants, and inter and transcontinental oceanic voyages and journeys, as well as the route of modern trade travel of natural resources. The game board is navigated during the course of play by answering questions about the countries along the route. An electronic device is used as a game accessory to enhance game play by running one or more software applications that provide supplemental sources of information that are flexible, convenient, on-demand and in a highly appealing format for the players.

19 Claims, 15 Drawing Sheets

(51) Int. Cl.
  A63F 3/00      (2006.01)
  G09B 7/00      (2006.01)
  G09B 19/00     (2006.01)
  A63F 9/24      (2006.01)
(52) U.S. Cl.
  CPC .......... *A63F 3/0402* (2013.01); *A63F 3/0434* (2013.01); *A63F 3/0449* (2013.01); *A63F 9/18* (2013.01); *A63F 9/183* (2013.01); *G09B 7/00* (2013.01); *G09B 19/00* (2013.01); *A63F 2003/041* (2013.01); *A63F 2009/242* (2013.01); *A63F 2009/247* (2013.01); *A63F 2009/2457* (2013.01)
(58) Field of Classification Search
  CPC .... A63F 2009/247; A63F 3/04; A63F 3/0421; A63F 3/0423; A63F 3/00895; A63F 2003/0431; A63F 3/0434; A63F 3/0449; A63F 3/00643; A63F 2009/2486; A63F 3/00006; A63F 3/00088; A63F 3/0402
  See application file for complete search history.

(56) References Cited

U.S. PATENT DOCUMENTS

| | | | | |
|---|---|---|---|---|
| 5,702,305 | A * | 12/1997 | Norman | A63F 9/24 273/237 |
| 5,951,013 | A | 9/1999 | Campanella | |
| 6,402,143 | B1 * | 6/2002 | Brindley | A63F 3/00063 273/143 A |
| 8,734,162 | B2 * | 5/2014 | Goldenberg | A63F 13/80 434/322 |
| 2004/0160004 | A1 * | 8/2004 | Levine | A63F 3/0434 273/254 |
| 2005/0074736 | A1 | 4/2005 | Perkins et al. | |
| 2005/0133995 | A1 * | 6/2005 | Walker | A63F 3/00 273/237 |
| 2005/0137004 | A1 * | 6/2005 | Wood | A63F 3/00643 463/11 |
| 2006/0261548 | A1 | 11/2006 | Casanova | |
| 2008/0293468 | A1 * | 11/2008 | McGeoghegan | A63F 3/00 463/9 |
| 2009/0017426 | A1 | 1/2009 | Higgins | |
| 2009/0152812 | A1 * | 6/2009 | Derrick | A63F 3/0434 273/236 |
| 2009/0253476 | A1 * | 10/2009 | Pestotnik | A63F 9/183 463/9 |
| 2011/0057388 | A1 | 3/2011 | Tamian et al. | |
| 2011/0130202 | A1 | 6/2011 | Smith et al. | |
| 2011/0175291 | A1 * | 7/2011 | Johnsen | A63F 1/02 273/292 |
| 2011/0221129 | A1 * | 9/2011 | Sisson | A63F 3/00643 273/237 |
| 2012/0049454 | A1 * | 3/2012 | Arduini | A63F 3/00643 273/249 |
| 2012/0058809 | A1 * | 3/2012 | Neveaux | A63F 1/04 463/11 |
| 2012/0248700 | A1 * | 10/2012 | Arduini | A63F 3/00643 273/242 |
| 2013/0069307 | A1 * | 3/2013 | Ward | G09B 5/06 273/238 |
| 2013/0181402 | A1 * | 7/2013 | Price | A63F 3/00006 273/237 |
| 2013/0277915 | A1 * | 10/2013 | Garrett | A63F 1/02 273/293 |
| 2013/0299569 | A1 * | 11/2013 | Gentile | G06Q 10/08 235/375 |
| 2014/0077455 | A1 * | 3/2014 | Baker | A63F 3/0434 273/273 |
| 2014/0151960 | A1 * | 6/2014 | Caffrey | A63F 13/213 273/237 |
| 2014/0178842 | A1 * | 6/2014 | Earnest | A63F 3/00072 434/129 |
| 2014/0367913 | A1 * | 12/2014 | Abreu | A63F 3/00006 273/243 |
| 2015/0290552 | A1 * | 10/2015 | Owoc | A63J 1/00 472/75 |
| 2015/0328541 | A1 * | 11/2015 | Van Haaften | A63F 13/06 463/42 |
| 2016/0284229 | A1 * | 9/2016 | Hatton | A63F 13/807 |

OTHER PUBLICATIONS

Trivial Pursuit: Welcome to America Edition; 1985; https://boardgamegeek.com/boardgameexpansion/12343/trivial-pursuit-welcome-america-edition.*

Munchkin; 2001; Steve Jackson Games; http://www.worldofmunchkin.com/rules/munchkin_rules.pdf.*

App Reviews—CrazyMikesapps.com; Trivial Pursuit Master Edition for iPad App Review—CrazyMikesapps; Jan. 19, 2012; Youtube; https://www.youtube.com/watch?v=ip2E8zRKyQY.*

FourClownsGameAndToy; CodigoCube Instructional Video; Aug. 29, 2011; Youtube; https://www.youtube.com/watch?v=eZGm4U9Acbg.*

Journal of Boardgame Design, "The Designer's Mind: Silk Road", Jan. 18, 2007, http://jbdgames.blogspot.com/2007/01/designers-mind-silk-road.html, 24 pages.

Wikipedia, "Chinese Finger Trap", Dec. 22, 2012, https://web.archive.org/web/20121222081011/http://en.wikipedia.org/wiki/Chinese_finger_trap, 4 pages.

* cited by examiner

BOARD GAME FOR CULTURAL LEARNING THAT INCORPORATES SMART DEVICE WITH SOFTWARE APPLICATION INTO GAME PLAY

CROSS-REFERENCE TO RELATED APPLICATIONS

This application is the National Stage of International Application No. PCT/US2014/027911 filed Mar. 14, 2014, which claims the benefit of and priority to U.S. Provisional Application No. 61/788,584, filed Mar. 15, 2013, the entireties of which applications are incorporated herein by reference for any and all purposes.

TECHNICAL FIELD

The invention relates to a board game that incorporates a smart device or tablet software application into game play. In particular, the invention relates to a board game that emphasizes cultural learning while incorporating a smart device or tablet software application that enhances game play by providing pronunciation of foreign language expressions and by providing alternate game play options through interactions with the software application.

BACKGROUND

Board games have been a source of entertainment for generations. However, traditional board games such as Monopoly® and Risk® have been somewhat displaced by other less socially engaging, much less family-oriented entertainment technologies such as video games that have emerged in the latter part of the $20^{th}$ century. At the same time, many board games have shifted to trivia type games with limited educational functions. The social and educational features of such contemporary games are quite limited.

The inventors submit that board games would experience a renaissance if they would more effectively provide a useful learning experience while at the same time providing social entertainment. It remains desirable to develop new board games that keep the best aspect of traditional board games (social interaction) while further enhancing educational features in a fun and entertaining way by combining an educational board game with software applications that are designed to enhance the game play. These and other desired features have been addressed with the invention described below.

SUMMARY

The invention provides the above-mentioned desired features by providing a board game that facilitates learning about other cultures. In an exemplary embodiment, a board game entitled "The Silk Road" engages the game players by asking the players to answer questions about different aspects of Chinese culture during the course of game play. In the exemplary embodiment, the game board is a map of China with the players navigating a commercial route such as the ancient Silk Route through China during the course of play by answering questions about China and its history, politics, customs, etc. Similar games may be made to facilitate learning about other cultures in countries such as India, Russia, Germany, Israel, Dubai, and the like using maps of those countries and routes such as famous pilgrimages as the inspiration for board movement during game play.

To facilitate more interesting game play, a smart device or tablet computer is used as a game accessory. In an exemplary embodiment, the smart device or tablet computer runs one or more software applications that provide supplemental sources of information that are flexible, convenient, on-demand and in a highly appealing format for the player. Tips, clues, enhanced explanations to questions, descriptions and pronunciation aids to Chinese words are just some of the paradigmatic advantages in which the power of the smart device, tablet computer, or other mobile computing device can be adapted to further engage, enhance and enrich the experience of board game players. The software applications do not fundamentally change the basic purpose or nature of game play but rather enhance its entertaining, learning and player challenge-oriented benefits, and thus hopefully set the groundwork for renewed appeal of the board game. Examples of interaction of the smart device or tablet computer application with the players during game play include proper voicing of the questions, accepting responses, searching an internal database for associated information of interest, performing web searching for associated information of interest, and the like.

BRIEF DESCRIPTION OF THE DRAWINGS

The various novel aspects of the invention will be apparent from the following detailed description of the invention taken in conjunction with the accompanying drawings, of which.

DETAILED DESCRIPTION OF ILLUSTRATIVE EMBODIMENTS

Figure 1:
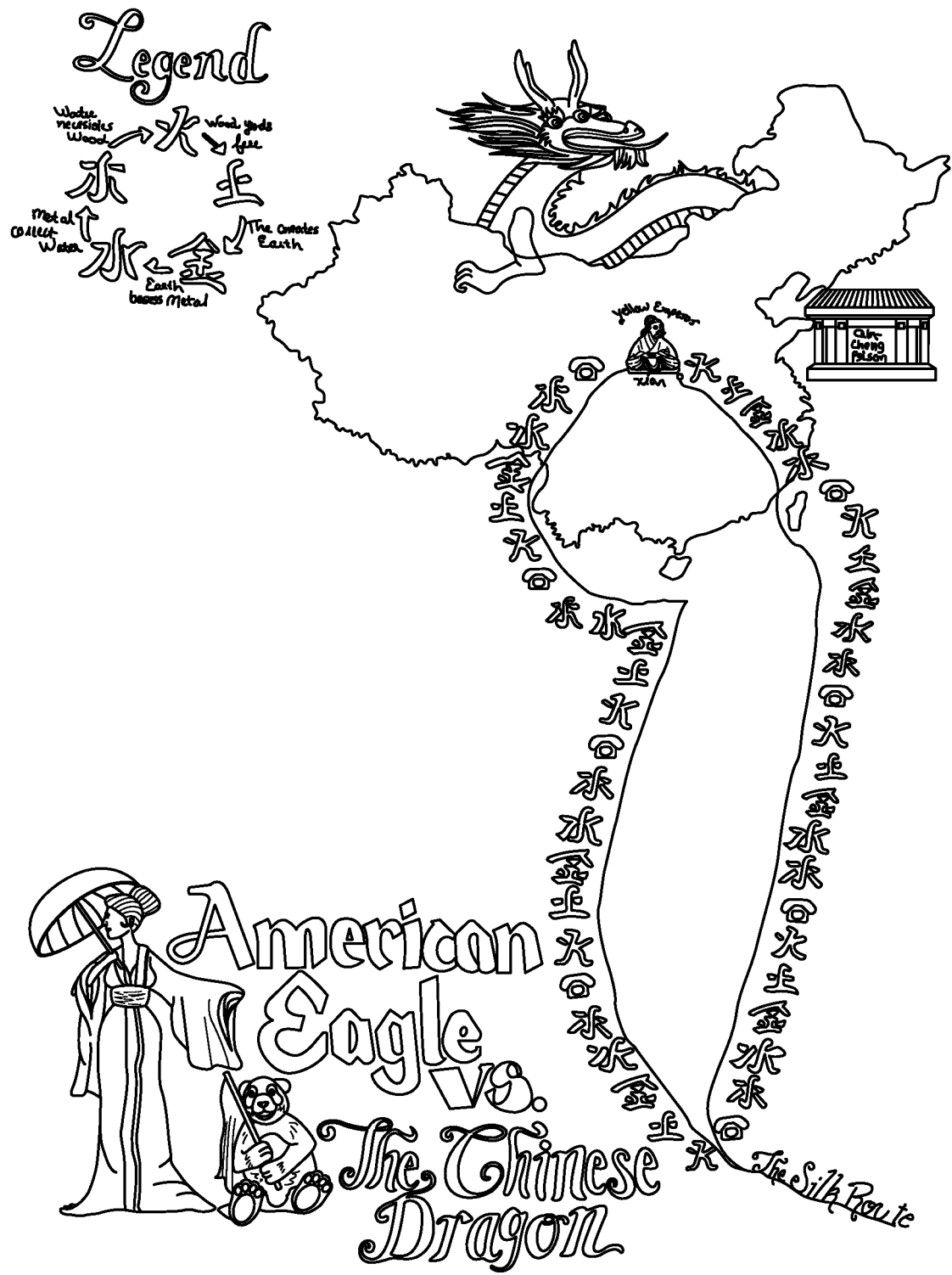
FIG. 1 illustrates a rendering of a sample game board for an American Eagle vs. Chinese Dragon embodiment of the board game.
Figure 2:
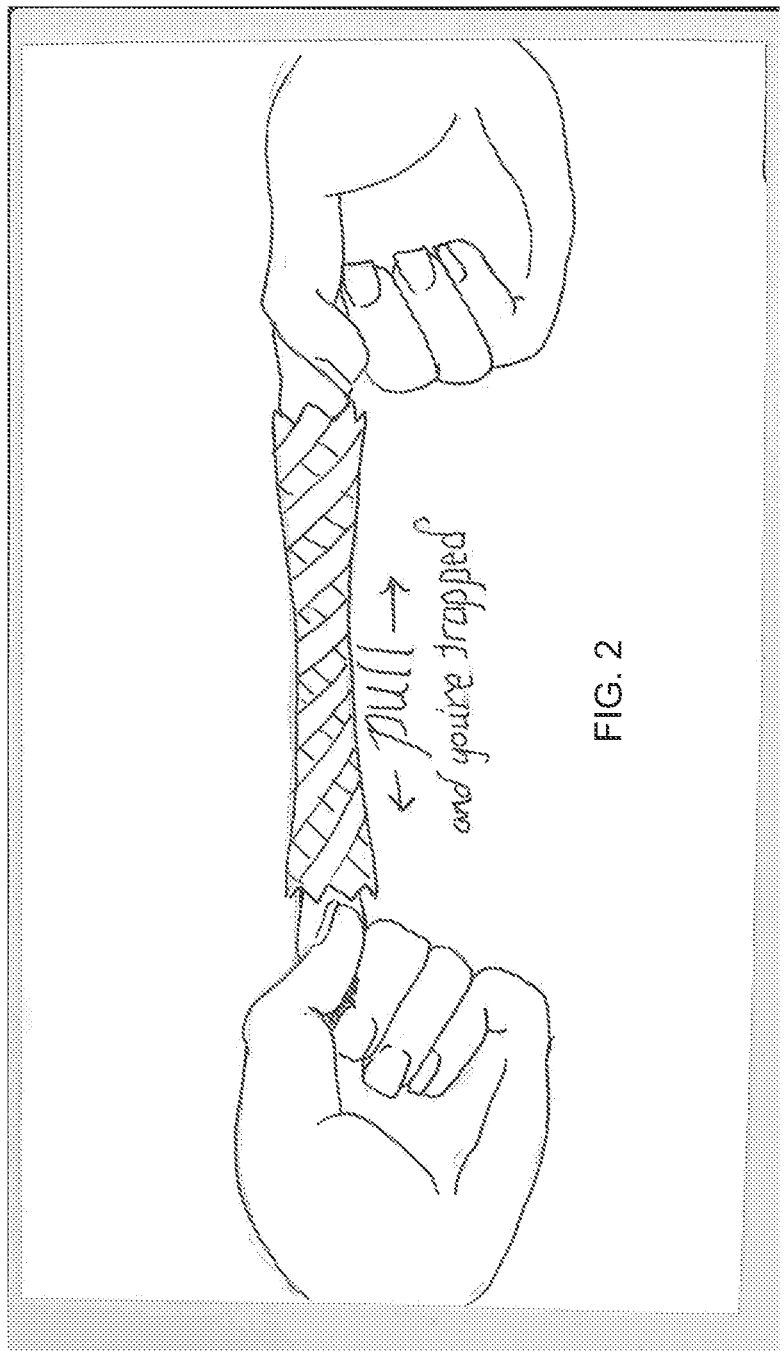
FIG. 2 illustrates fingercuffs that a player wears when he loses his/her turn, in certain variations of the game.

The invention will be described in detail below with reference to FIGS. 1-8. Those skilled in the art will appreciate that the description given herein with respect to those figures is for exemplary purposes only and is not intended in any way to limit the scope of the invention. All questions regarding the scope of the invention may be resolved by referring to the appended claims.

Overview

The invention relates to a board game that facilitates learning about other cultures. In an exemplary embodiment, a board game entitled "American Eagle vs. the Chinese Dragon" or "The Silk Road" engages the game players by asking the players to answer questions about different aspects of Chinese culture during the course of game play to create American interest and awareness about Modern China in a fun and popular way. In the exemplary embodiment, the game board is a map of China with the players navigating a commercial route such as the ancient Silk Route through China during the course of play by answering questions about China and its history, politics, customs, etc. Similar games may be made to facilitate learning about other cultures in countries such as India, Russia, Germany, Israel, Dubai, and the like using maps of those countries and following the established paths of merchants, explorers, pilgrims and missionaries and, in the case of Russia, water tributaries. These routes would provide the inspiration for board movement during game play. For example, in addition to the Silk Road, the game board and game play may center around the Amber Road in Eastern Europe, the Spice Route over the Indian Ocean and Red Sea, the Santa Fe and Oregon Trails in the Western United States, the Incan Road System in Western South America, the Hanseatic Trade Route in Northern Europe, the Trans-Saharan Trade Route in Western Africa, the Maris Roads of the Roman Empire over the Mediterranean, Europe and Northern Africa, the Volga Trade Route from Russia to the Middle East, the Varangian Greek Trade Route from Northern Europe to Greece, the Way of St. James through Europe to Spain, the Francigena Pilgrimage from Canterbury to Rome, Marco Polo's route over the Silk Road from Venice to Beijing and back over the Spice Route, the Allegheny trail in the Eastern United States, Ukrainian gas and oil pipelines, diamond routes from Angola to Botswana, coal or other mining routes within continents, and Route 66 across the United States. Of course, there are numerous other regions that may provide the inspiration for board movement during game play within the scope of the exemplary embodiments.

To facilitate more interesting game play, a smart device or tablet computer is used as a game accessory. In an exemplary embodiment, the smart device or tablet computer runs one or more software applications that provide supplemental sources of information that are flexible, convenient, on-demand and in a highly appealing format for the player. Tips, clues, enhanced explanations to questions, descriptions and pronunciation aids to Chinese words are just some of the paradigmatic advantages in which the power of the smart device, table computer, or other mobile computing device can be adapted to further engage, enhance and enrich the experience of board game players. The software applications do not fundamentally change the basic purpose or nature of game play but rather enhance its entertaining, learning and player challenge-oriented benefits, and thus hopefully set the groundwork for renewed appeal of the board game. Examples of interaction of the smart device or tablet computer application with the players during game play will be described in more detail below.

Game Contents

First Embodiment

A first embodiment of a board game is entitled "American Eagle vs. the Chinese Dragon" and is designed for two to six players, preferably ages 16 to adult. The contents of an exemplary game board include:

1. Game board: A map of China showing all provinces and small cultural representations of what the provinces are most known for (animals, cuisine, antiquities, infrastructure, ports, etc.) to create visual interest. The provinces will be numbered according to population. The game board takes the Five Elements (Wu Xing) representing category questions (described below) through the Silk Route pilgrimage throughout China. The Silk Route passes through land and water superimposed as board movement squares on the map of modern China. The game squares are Wu Xing itself, e.g., the Five Elements going clockwise around the historic ancient Silk Route. These themselves are artistically minimalist rendered in color coded Chinese characters representing Wood, Fire, Earth, Water and Metal as shown in the legend depicted in the game board rendering in FIG. 1. As in FIG. 1, the Silk Route will be shown with a dotted line alongside the landing spaces. The landing spaces consist of the integrated universal elements of Fire, Water, Wood, Water and Earth. The meaning of these elements has been extrapolated to form an integrated learning experience. Board landing spaces also include pearls and pirates near water and gems and bandits near land and Red Phone Wild cards which present dramatic diplomatic scenarios and have a negative outcome. Color coded cards complementing the elements show the player which card to draw based on the roll of the die. Game boards are generally printed 24 inches by 24 inches or less.

2. Guide Booklet: This booklet is a guide for use by each player to pronounce Pinyin names and places in the game and in the questions, as well as an overview of the original Silk Route. Other manifestations of modern commercial routes also may be employed.

3. Rules and Pronunciation guide: The rules are printed on a Chinese Menu-style paper take-out flyer and include the game rules described below.

4. One six-sided die with a USA theme.

5. One traditional Chinese tea pot with Chinese characters for use in shaking the die.

6. Chinese Fingercuffs are provided as a punishment for bribing. A Chinese finger trap or Chinese handcuffs and similar variants is a gag toy of the type shown in FIG. 2 that traps the victim's fingers (often the index fingers) in both ends of a small, woven bamboo cylinder. The initial reaction of the victim is to pull the fingers outward, but this only tightens the trap much more. The solution to escaping the trap is to push the ends inward toward the middle, which enlarges the openings and frees the fingers, before slowly twisting them out of the trap so as not to trigger the tightening reflex again. A second form of escape is to push one's fingers together and then grab the ends of the trap with one's middle fingers and thumbs. The fingers can then easily be pulled out. The fingercuffs represent being unable to move or progress because of the lack of knowledge about China, e.g. losing American advancement because of ignorance of geopolitical realities.

7. Six multi-color American Eagles tokens; red, blue, green, black, gold, and silver, all representing the United States.

8. 30 green stackable poker chips, representing Money.

9. 30 white poker chips, representing Influence.

10. 30 blue stackable poker chips, representing Power.

11. Question and answer cards, in 5 different elemental categories (Wu Xing) such as wood, metal, earth, fire, and water. The questions align to the meaning of the elements could also encompass categories such as history (wood), culture (water), politics and military (fire), business, economics, and infrastructure (fire), etc. depending upon the type of educational content required to create integrated learning out of the elements of traditional Wu Xing.

12. 16 Red Phone Wild Cards: Red Phone Wild cards provide opportunities to call the Communist Party for help out of Debtors Prison when a player falls behind and ends up out of money, in debtor's prison, or in fingercuffs.

13. 24 Dragon cards: Dragons are the antithesis of the American Eagle and are provided to the player for wrong answers or other improper game play. A player cannot win while holding a Dragon Card.

14. A smart phone or tablet computer software application is downloaded to read questions and possible answers as an aid in the pronunciation of Chinese words for American (non-Chinese speaking) players. The reading is performed using a speech to text module (See FIG. 3). The Chinese words are key terms and phrases in Pinyin and provide clues to other questions to advance around the board. The software application may be downloaded for free by purchasers of the game. Players who do not own the game may buy the software application or simply use the Guide Booklet to guide pronunciation of terms included in the game.

Rules of Game and Game Play

The goal of the board game entitled "The American Eagle Vs. The Chinese Dragon" is to excite, educate, teach and instill a curiosity about other cultures (in this case China) by asking questions about China that respect the country and its citizens and provide advancement in game play for showing an understanding of China and its culture. The players of the game follow the Silk Route as the earliest example of globalization and commercialization and a guide to the world's most populous country, as well as a country of great geopolitical significance.

Players learn contextual facts about modern and historical China in an integrated way through an integrated development of questions—history, terrain, economic significance, and politics, diplomacy, natural resources, economics and biodiversity while having fun and using their smart phones or tablet computers master pronunciation of both important and common names and places. Players accumulate wealth, power, and influence, in order to win. Americans in the form of Eagles tokens of different colors compete against one another on Chinese terrain. Winning through knowledge about China is key; therefore, players want to stay away from the Dragon which represents China, or they will get burned. If they bribe other players, they are punished and end up in fingercuffs. If they fail to answer questions and lose their chips, they end up in debtor's prison and may re-enter play through a bribe but must wear fingercuffs for a round of play.

Set-Up:

The players begin play as follows:

1. The players choose a banker by rolling the die in the Chinese Tea Pot. The banker is in charge of the Money, Power, and Influence chips, and the Dragon cards. The banker gives an even number of Influence chips to each player, and then puts aside any extras. For example, if there are six players, each get five chips; if five players, each get six chips; if four players, each get seven chips and two are placed aside, etc.
2. Each player chooses one Eagle token, and places it on the board on the square marked "Start."
3. Players roll the die in the Chinese Tea Pot once. The player who rolled the highest number goes first. If the highest roll is a tie, each of the tied players roll again in the Chinese Tea Pot until one player emerges with the highest number. That player then goes first.

Question and Answer Cards:

The cards are divided into five categories representing the Chinese symbols of Wu Xing meaning "elements." (http://en.wikipedia.org//wiki/Wu_Xing) An artistic rendering of the appropriate element appears on the back of each card. As an example, illustrations of such artistic renderings may be found at http://ideas.wikia.com/wiki/File:500px-Wu_Xin_tarot.png. In an exemplary embodiment, the cards represent the following elements:

(card color brown) WOOD: Modern History and Politics since 1911;
(card color gray) METAL: Business/economics;
(card color green) EARTH: topography/geography/terrain/natural resources/infrastructure/biodiversity;
(card color red) FIRE: Modern politics/foreign policy/military;
(card color blue) WATER: cultural and religion and philosophy.

Of course, the corresponding categories may be different for games built around other regions or traditions. For example, a game based in Israel or around the Jewish diaspora could use Wu Xing metaphors around the Torah including rock, light, path, shield, and sword.

Each card may contain different categories of questions with different rewards for correct answers. For example, when a Category 1 question is answered correctly, the player earns a Money chip; when a Category 2 question is answered correctly, the player earns a Power chip; when a Category 3 question is answered correctly, the player earns a Money chip; when a Category 4 question is answered correctly, the player earns a Power chip; and when a Category 5 question is answered correctly, the player earns an Influence chip Red Phone "Wild" Cards:

A red phone is a sign of status in Communist China American competition through knowledge of China is the focus of this game. Therefore, if a player lands on a Red Phone Card space, the player must take a Red Phone Card from the box. The Red Phone Cards provide diplomatic conflict situations for the player that must be resolved. As in real life, when Americans contact Communist China for assistance, the outcome is not necessarily positive. In this game, all Red Phone Cards end the player's turn.

Sample Red Phone Cards include:

Red Phone Wild Card

1. The Communist Party has decided to expel all foreigners. Player loses all Money, Power, and Influence chips. Player keeps all Dragon cards. Player's turn ends.
2. Pick one player to be your opponent. Each player rolls the die once. The player with the highest roll wins. Original player: If the winner, rolls again; if the loser, turn ends. Opponent: If the winner, nothing happens; if the loser, lose one Power chip.
3. The US raises import fees. China responds by calling in all US loans. Player loses two Money chips. If the player doesn't have two Money chips, the player takes two Dragon cards instead. The player's turn ends.
4. North Korea, a Communist neighbor, tests an ICBM with the potential to hit Hawaii. The US asks China to put pressure on North Korea to stop the test. Player uses one Influence chip to stop the test. If the player has no Influence chips, the player takes one Dragon card instead. Player's turn ends.
5. China experiences a severe earthquake and asks the US for aid. The US agrees to send humanitarian aid. Player loses one Money chip. If the player doesn't have a Money chip, the player takes one Dragon card. Player's turn ends.
6. South China experiences an outbreak of SARS. China requests US medical assistance. The US agrees, with the stipulation that China will support US foreign policy towards Iran at the next UN session. The player, as China, has to make a decision. If the player accepts US aid, the player loses a Power chip. If the player rejects US aid, the player loses an Influence chip. If the player doesn't have either chip, the player takes a Dragon card. Player's turn ends.

7. Chinese Muslim minority Uighurs rebel, possibly agitated by Muslim extremists. China asks the US for intelligence on Islamic extremists in Central Asia. Player loses one Power chip. If no Power chip, the player takes a Dragon card. Player's turn ends.

8. China and the US disagree openly at the UN. Player picks one player to debate. Both roll the die twice. The player with the highest total roll takes one Power chip from the loser. If the loser has no Power chip, the winner may take either Money or Influence. If the loser has no chips, the loser must take one Dragon card. Player's turn ends.

9. Chinese college students rebel. The US agrees to take more Chinese exchange students if China will listen to the college students demands. Player rolls the die once. If the player rolls an odd number, the player loses one Power chip. If the player rolls an even number, the player has convinced China to listen and there is no consequence. Player's turn ends.

10. Pirates threaten major oil tanker routes supplying China with crude oil. China asks the US to send the US Navy to help crack down on piracy and open the shipping lanes. Player rolls the die once. If the player rolls an even number, the player has accepted China's request and loses one Money chip. If the player rolls an odd number, the player has rejected China's request and loses one Power chip.

11. China launches an expedition to establish a manned outpost in space. China wants permission to fly over US airspace. Player rejects China's request and loses one Influence chip. Player's turn ends.

12. A rebellion in a Central African nation threatens China's supply of uranium. China asks for UN support in ending the rebellion. The US tries to influence the UN to send aid. Player loses one Influence chip. If no Influence chip, player takes one Dragon card. Player's turn ends.

13. The Chinese threaten to stop allowing the US to adopt Chinese babies. The US tries to influence the UN to step in and change this policy. Player loses a Power chip. Player's turn ends.

14. The Chinese population is getting sick due to polluted water. China asks the US for technology to clean the water. Player loses one Money chip.

15. The Great Wall begins to crumble. China asks the US for expertise in rebuilding the ancient structure. Player loses one Money chip. Player's turn ends.

Dragon Cards:

When a player answers a question incorrectly, the player receives a Dragon card. The game cannot be won by a player holding a Dragon Card. The method of getting rid of Dragon Cards is explained in "The Game Play" section below.

Game Play

During play of the game, each player moves his/her Eagle token in accordance with the roll of the die. The player to the left will take the question and answer card from the box and ask the question of the player who moved the Eagle token. The correct answer is indicated on the card by an "*". The first player, let's call him or her Player 1, rolls the die once and moves his/her chip the number of spaces indicated on the die. The player to the left, let's call him or her Player 2, takes one card from the box of question and answer cards, relating to the space where Player 1 landed. For example, if Player 1 begins on the "Start" space, and rolls "one" on the die, Player 1 will move to Category I, Modern Chinese History Since 1911. Player 2 will ask a question from the Category I section of the card box. After the question has been answered, the card is returned to the box, at the back of the appropriate section. If Player 1 answers correctly, the banker will give the player a chip (see above list for which chip to take). Player 1 takes the chip and places it on the board under the player's token. In an exemplary embodiment, the chips and Eagle tokens are stackable so that players may see who is winning and who is losing at a glance. Player 1 then rolls again and the play continues, again, answering a question from the category indicated by the space landed upon. If the player gives an incorrect answer, the player gets a Dragon card, and the player's turn ends. Play then continues to the player on the left. For each player's turn, the die is rolled once and the player moves his or her token, then answers questions. If the player lands on the Red Phone Card space, player must take a card from the Red Phone Cards. The card must be read aloud and the actions indicated must be taken. After the actions have been taken, the player's turn ends, and play again moves to the left.

As noted above, players cannot win the game if they hold a Dragon card. When a player has one Money and one Power chip, the player can get rid of the Dragon card by giving the banker the two chips and the Dragon. The Dragon card is returned to the deck of Dragon cards. The returned chips are removed from game play.

When a player is stumped for an answer, and wishes to, the player may attempt to "bribe" the player asking the question. Bribes are paid for by Influence chips. Player may only use one Influence chip per bribe. If Player 1 bribes Player 2, the one Influence chip goes into Player 2's pile. Player 2 then repeats the question, removing one possible incorrect answer. For example, if the answer is "a", the player, after being bribed, will repeat the "a" and either "b" or "c" choices. If Player 1 answers correctly, the reward is still either a Money or Power chip; incorrectly, the consequence is still a Dragon card. People who bribe fellow players wear Chinese finger cuffs for a round.

After each player has had one turn, a player with no Money, Power, or Influence chips is sent immediately to the Debtor's Prison. The Player does not roll or move their Eagle token; however, that player still asks questions of the player to his or her right. If the player in Debtor's Prison is bribed, the player may move from Debtor's Prison and go back into play. In one variation of the rules, a "reverse bribe" may also enable a debtor to get out of prison if the player to whom the question is being read bribes the debtor with say, two dragon cards plus one chip. Note that even though the debtor is in a worse overall position while the other player is in a better one the fact that the debtor now has gained one chip (versus previously none) entitles him to leave prison through the resumption of play which may be a reasonable exchange.

To Win

The game ends when all the chips of one denomination, either Money or Power, are distributed from the bank. The player with the most total chips, Money, Power, and Influence, and with no Dragon cards, wins.

Those skilled in the art will appreciate that other novel variations of board game design may be gainfully implemented in conjunction with the novel features of the herein proposed board game system, so as not to limit the potential scope of such additional variations to the currently proposed board game. For example, in one novel variation there could be different versions of the board game that vary in design by age group of the players e.g., children, youth (middle school) and adult (sixteen and older) or by explicit skill level (e.g., beginner, novice, advanced, expert), which alternatively could be ranked according to terms corresponding to a type of Chinese ranking system measuring degree of skill or mastery of a discipline. In a similarly related variation, play could be adapted to enable different ages (or specific skill levels) to be able to play together while adjusting for the innate differences in their competitive abilities. For example, a family with adults, grade school age children and younger children could, in principle, play the game together and be relatively evenly matched from a competitive standpoint if players from each age group only selected cards from a stack that corresponded to their own age group (in accordance with a decreasing handicap corresponding to decreasing age or skill level).

The Smart Phone or Tablet Software Application

The "American Eagle vs. the Chinese Dragon" smartphone or tablet computer software application is downloaded by one or more game players and registered to the game player for free when the game is purchased or for a one-time download fee along with renewal fees for updates or on-going subscription. The following illustration of this service is simply one example of numerous potential ways in which the features of such software applications may be implemented in conventional smart phones or tablet computers to both enhance and facilitate the learning and entertainment objectives of a board game such as the board game described above. The software application offers additional game play features by providing supplemental sources of information that are flexible, convenient, on-demand and in a highly appealing format for the player. In the context of the game play described above, the software application provides tips, clues, enhanced explanations to questions, additional questions, descriptions and pronunciation aids to Chinese words in multimedia format to further engage, enhance and enrich the experience of board game players using smartphones, tablet computers, or related mobile devices.

The primary purpose of a software application in accordance with the invention is to further enhance the entertainment appeal of a learning-oriented game and to thereby provide further utility in the game play endeavor. Accordingly, the software application does not fundamentally change the basic purpose or nature of play but rather enhances its entertainment value by providing learning and player challenge-oriented benefits, and thus hopefully set the groundwork for renewed appeal and hopefully play a role in the renaissance for traditional board games. Those skilled in the art will appreciate that many aspects of the game play described above may be optionally implemented in such a software application while also providing the extra features for enhancement of game play.

Figure 3:
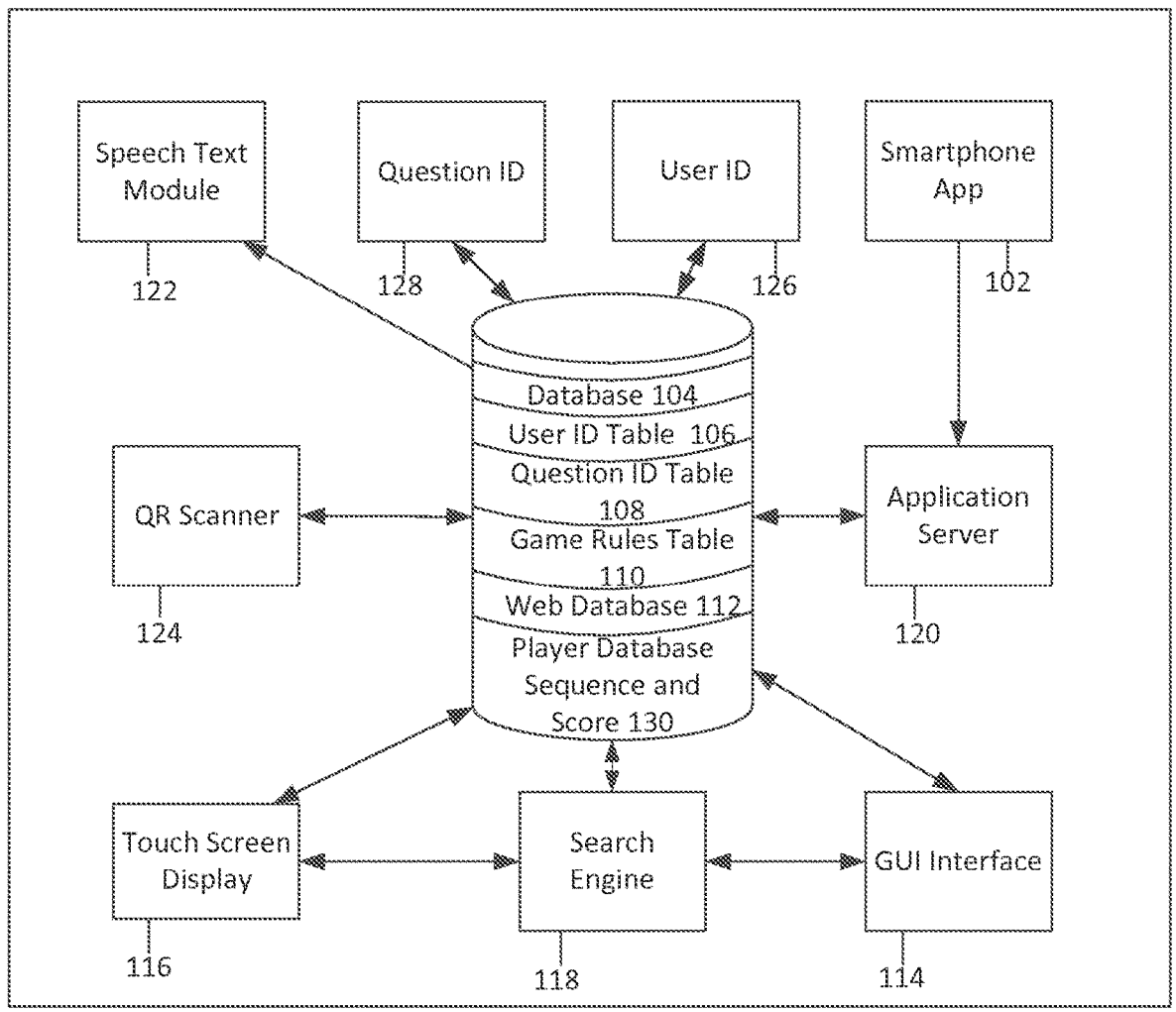
FIG. 3 illustrates a sample smart device or tablet computer that implements a software application for enhancing game play.

FIG. 3 illustrates an exemplary embodiment of a smart phone or tablet computer 100 in accordance with the invention. The smart phone or table computer 100 includes a processor (not shown) and numerous hardware and software features that are used by downloaded smart phone software application 102 in an exemplary embodiment. The player accesses database 104 including user ID table 106, question ID table 108, game rules table 110, player sequence and score database 130, and web database 112 for access by the player using GUI interface 114 and/or touch screen display 116. The player may access a search engine 118 through GUI interface 114 and/or touch screen display 116 to selectively search the database 104. Application server 120 serves the smart phone software application 102 and accesses information in the database 104 and database 130 in response to the corresponding process steps of the smart phone software application 102. Audio outputs from the database 104 are provided to speech text module for audibilizing the retrieved data as appropriate. Also, a QR scanner 124 may be used to access information in the database 104 or to initiate a web search for information to add to the database 104, as appropriate. The player sequence and score table from database 130 is accessed to maintain a proper sequence of player turns and to keep a running tabulation of player scores. Finally, user ID 126 may be used to authenticate the player to access a designated user ID table 106 (in the case of multiple players on multiple devices), and question ID 128 may be used to identify questions in the question ID table 108.

Figure 4A:
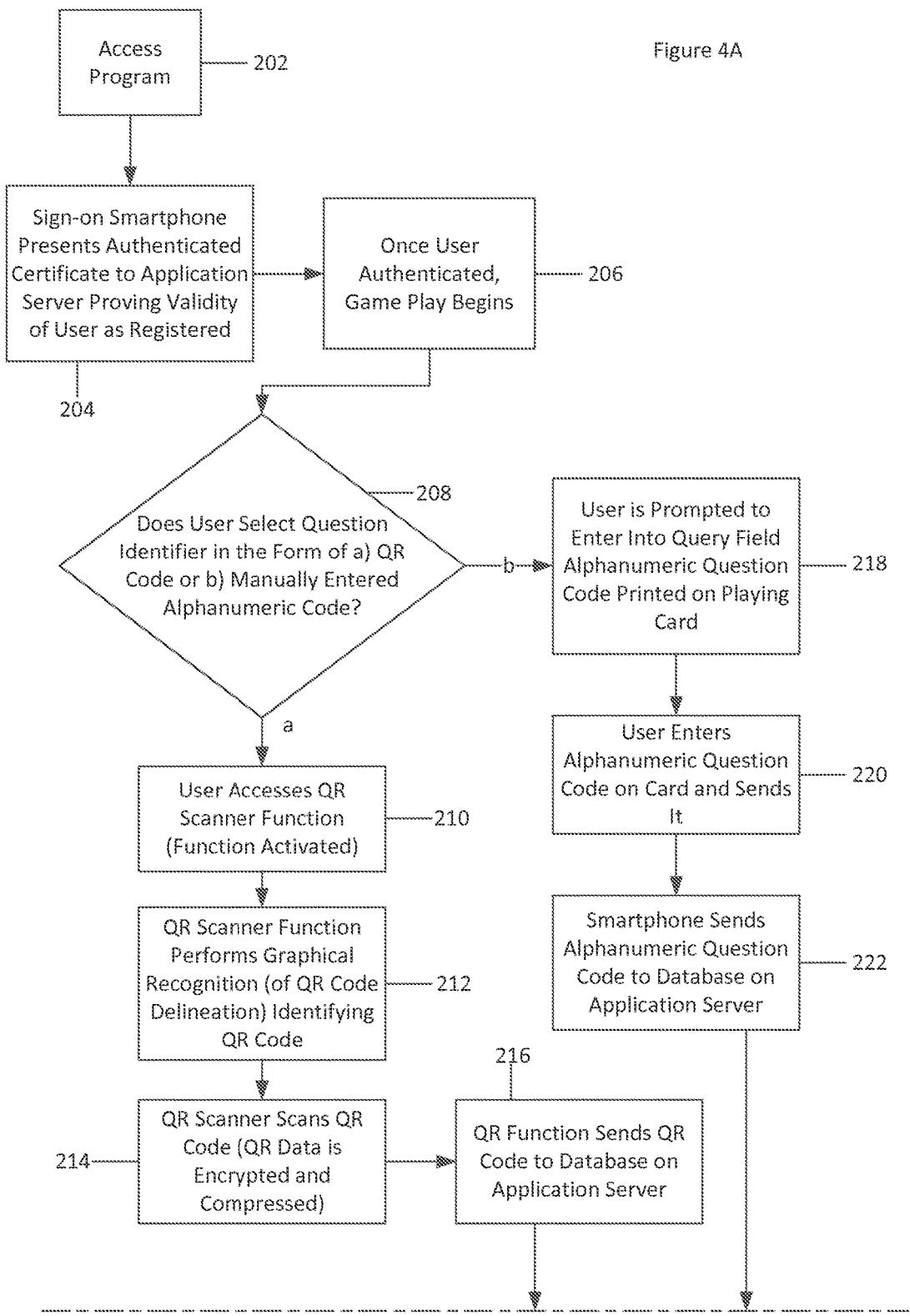
FIGS. 4A-4D together illustrate a sample software flow for a software application that runs on a smart device or tablet computer for enhancing game play in exemplary embodiments of the invention.

FIGS. 4A-4D together illustrate the information flow from the start to the completion of the player's engagement of the software application 102 for typical use in the game play described above, for example. As noted above, the software application 102 is designed to improve and enhance the game plays by opening-up a whole new set of envisaged possibilities for game play variations and future upgrades. Once the software application 102 has been downloaded, the software application 102 is accessed at 202. The player sign-in process proceeds at step 204 by enabling the application server 120 to access informational content accessible to the software application 102 as stored in database 104 to verify registration of the player. For example, the player may be authenticated by presenting a digital certificate to the application server 120 which, in turn, authenticates the registered player and current valid registration status of the player with the game service. The verification of these requirements sent back to the software application 102 allows the player to then proceed with using the game service at step 206 located on the application server 120 as well as the software application 102 installed on the player's smartphone or tablet computer 100. As indicated in FIG. 4A, game play begins at step 206 along with other players participating in the game (who also follow the same process of initiating and enabling use of the software application 102 as appropriate). In like fashion to board game style play, each of the players follows each other sequentially waiting for his/her turn in a given round of play. In the illustrative embodiment, each player typically has his/her smartphone or tablet computer software application 102 open and whether he/she takes advantage of using the software application 102 typically depends initially upon the player's own command of the material as it relates the question content on the card which the player ends up drawing and whether in the player's opinion the software application 102 could enhance the likelihood of his/her being able to answer the question correctly. If it does, the player may then follows the prompts on the software application 102 to input the identifying information (question identifier) associated with the question card at step 208.

Information may be inputted into the software application 102 typically one of two ways (or optionally to the player). The player may utilize the camera input on the smartphone or tablet computer 100 to scan a QR code on the card (a portion of which contains the question identifier) at steps 210-216, where the scanning/encoding and communicating question identifier provided to the database 104 is located on the application server 120. On the other hand, at step 218 the player may be prompted to enter the alphanumeric question ID printed on the playing card and/or other data into a query field for the software application. At step 220, the player may input the question identifier by entering an alphanumeric code printed on the card as depicted and the alphanumeric question code is communicated to the database 104.

At step 224, the process for information retrieval is performed whereby the question identifier portion of the QR code (or the alphanumeric code) queries the question code table 108 of the database 104 on the application server 120 for the software application 102 in order to retrieve the question corresponding to the player's playing card at step 226. Typically, at step 228 the player may confirm successful delivery of the correctly matching question by displaying it upon the player's smartphone screen 116. Similarly, the alphanumeric question ID may be used at step 230 to query the question code table of the database 104 on the application server 120 for the software application 102 based on manually entered user data from step 222.

Figure 4B:
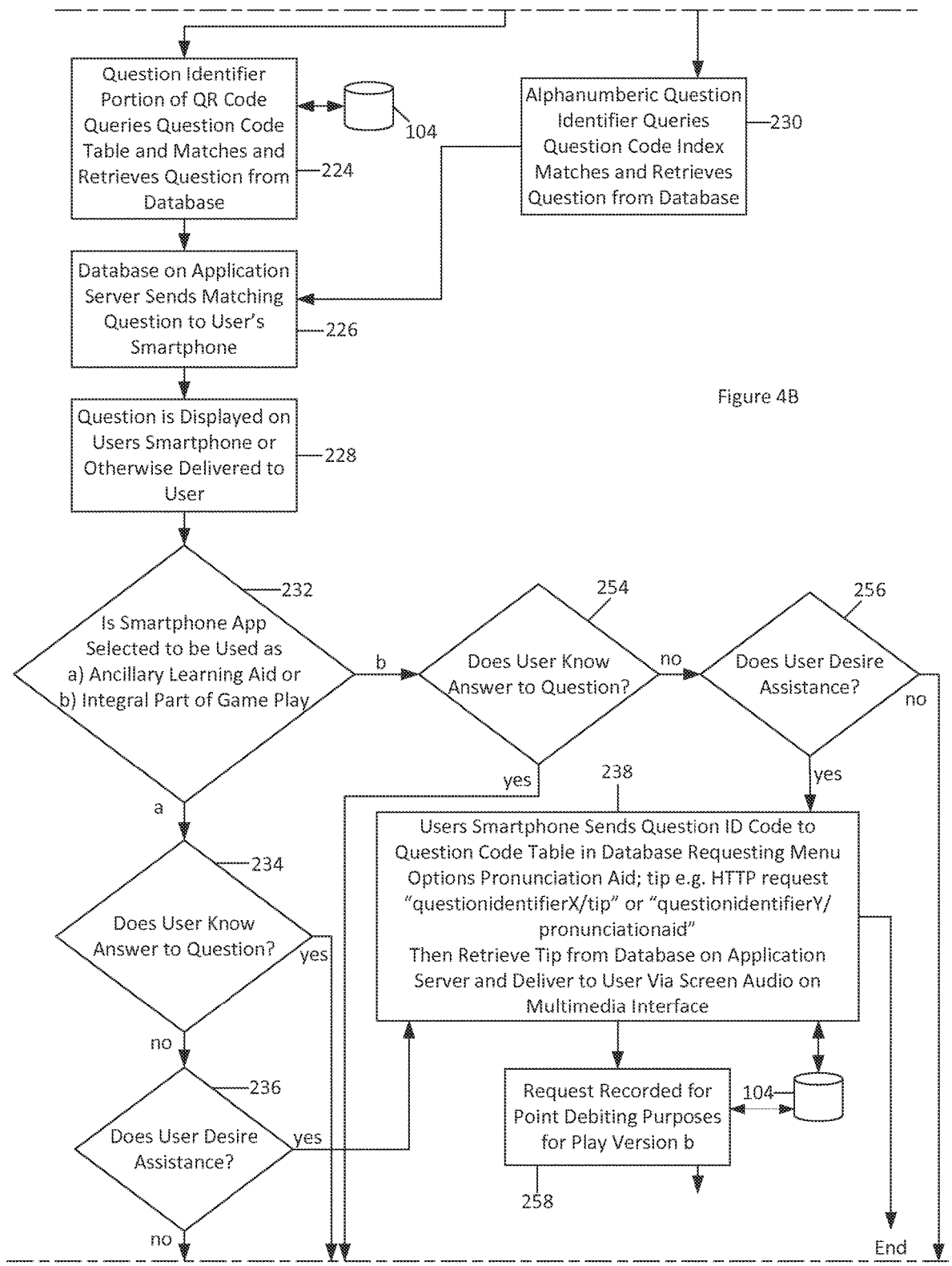
Figure 4C:
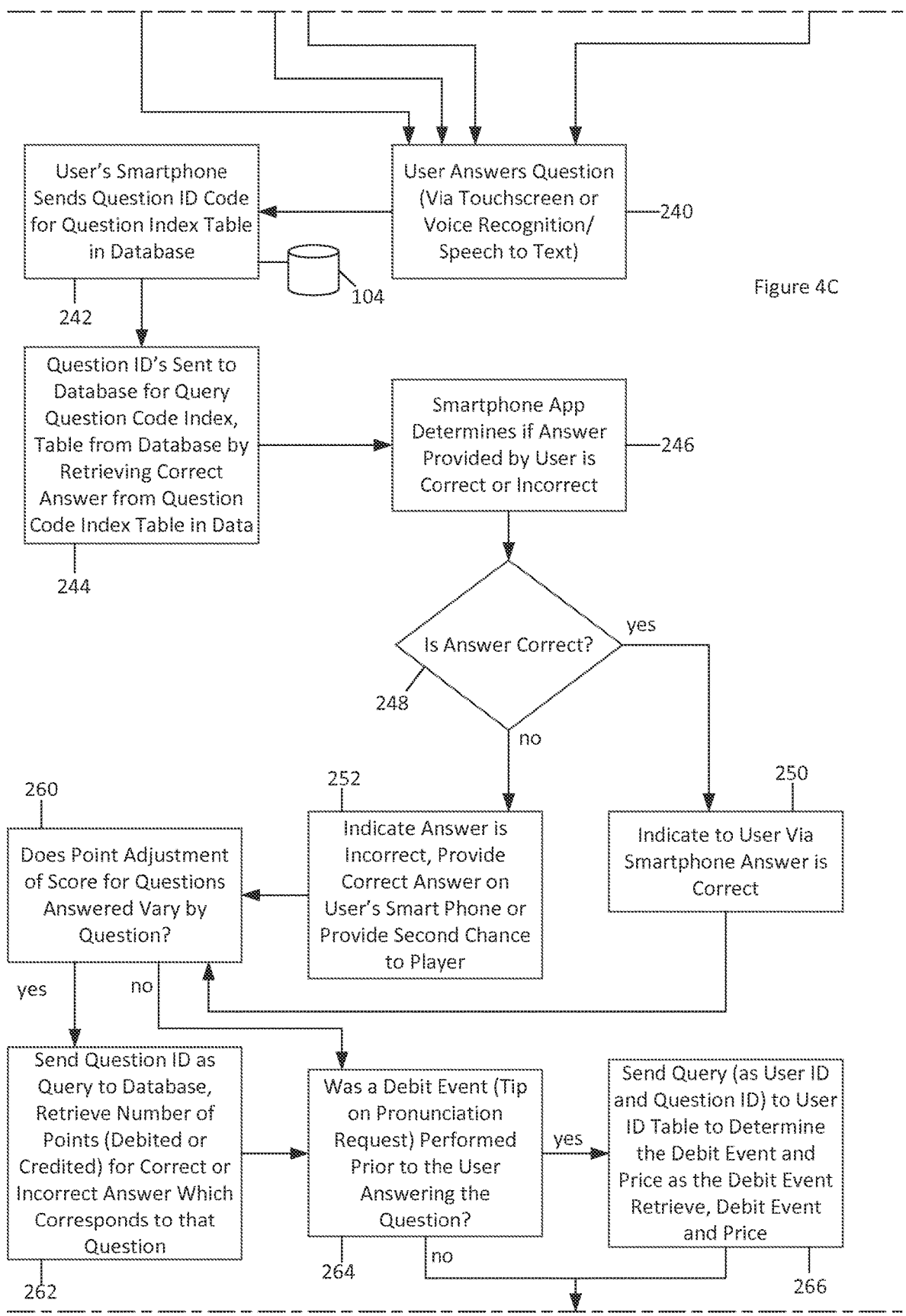
Figure 4D:
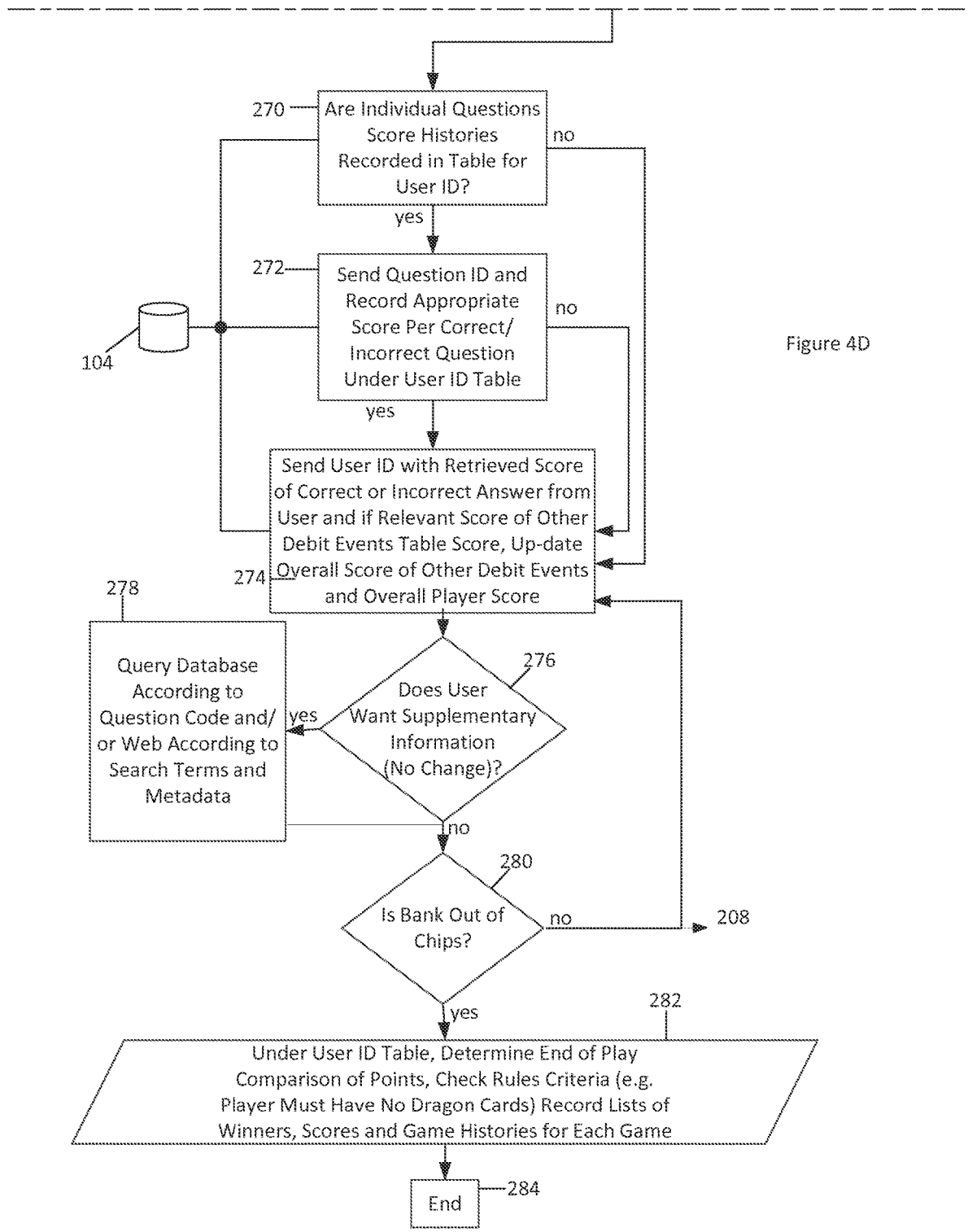
Figure 5:
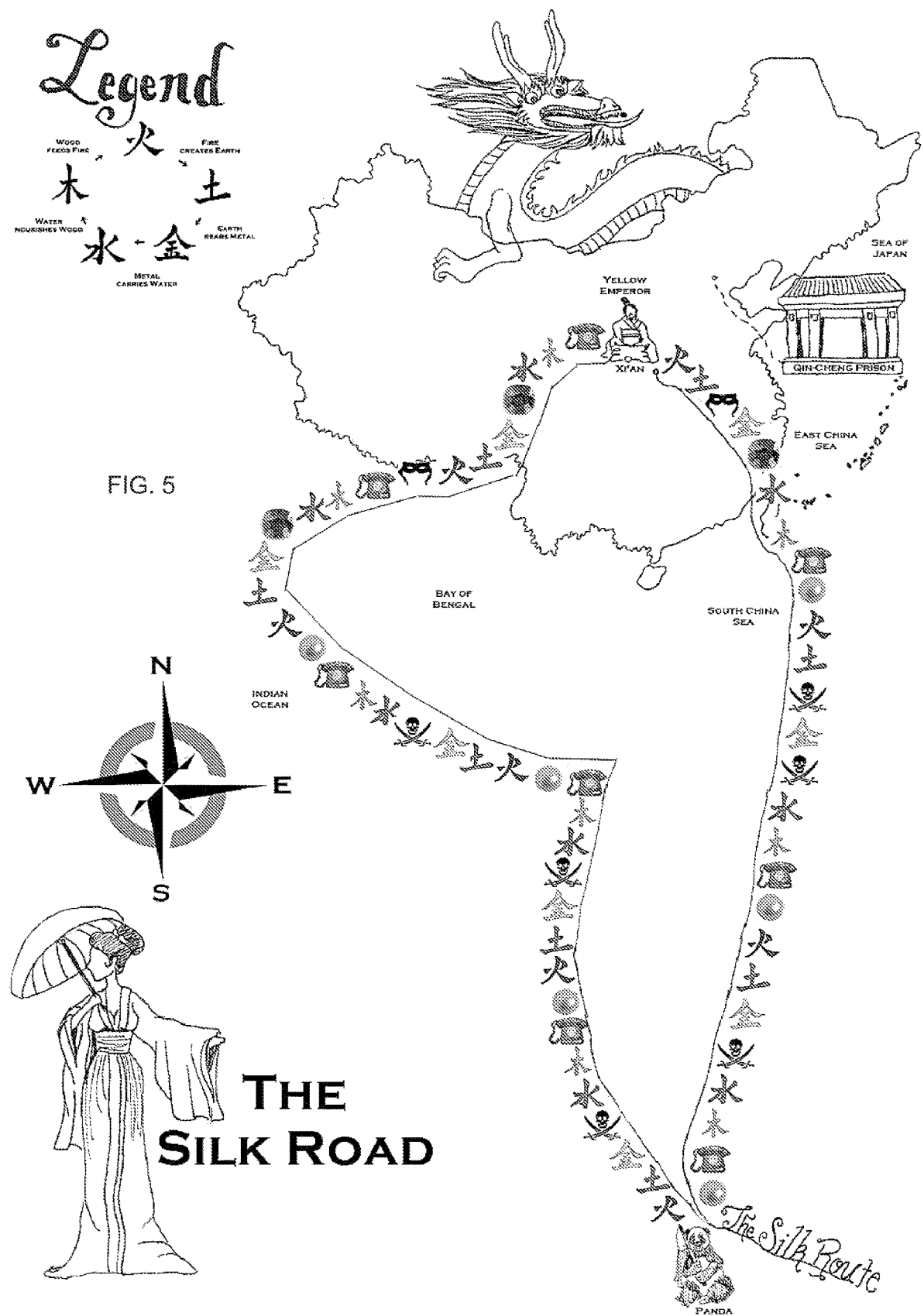
FIG. 5 illustrates a rendering of a sample game board for a Silk Road embodiment of the board game.

FIG. 4B further depicts at step 232 a decision point in which the player may engage the software application 102 in game play either by using it as a separate and standalone ancillary learning aid at (a) or as an integral part of the game play at (b). If the player elects to use the software application 102 as an ancillary learning aid, path (a) is followed. Election of path (a) or (b) may be made after the player has read the question and weighed the likelihood that s/he can answer the question correctly and in a way that is satisfactory to the required criteria of play. If the player is convinced s/he can answer the question in a satisfactory manner at step 234, typically no other assistance that the software application 102 can provide will be necessary inasmuch as in the illustrative embodiment smartphone-mediated aids, be they clues to questions or audio-based pronunciation aids, would typically carry some sort of cost to the player be it monetary or a finite number of times that an aid can be used per game. On the other hand, if the player instead is not confident that s/he knows (or fully understands) the question, s/he may then consider the next decision step 236 which is whether s/he desires assistance from the software application 102. As noted above, during basic game play of a game such as the American Eagle vs. the Chinese Dragon, absent the incorporation of the software application 102 in board game play, the player who is stumped or unsure of the answer has the option of bribing the player reading the question to him/her with an influence chip. For example, the player may not know the answer to the question ("no" at step 234) and then s/he must decide whether to decide to utilize the software application 102 assistance at 236 to obtain, for example, a clue or pronunciation aid. If the player desires assistance ("yes" at step 236), assistance information such as a pronunciation aid is pulled from the database 104 and provided to the player at step 238. On the other hand, if the player elects not to accept the assistance (typically indicating the player's choice to instead pay the reader a bribe), the player answers the question at step 240 (FIG. 4C). If "yes" is chosen at step 236, the software application retrieves the options for assistance according to those recorded under the table entry in the question ID table in the database 104 (typically unique to that particular question), for example, further explanation of different answers, a direct clue to the answer, elimination of an incorrect option, an additional "free" guess, elimination of an incorrect option (as with the bribe alternative) or assistance in pronunciation of the word or symbol (if relevant). To further illustrate the benefits of closely integrated device functionality with that of board game play, in a variation of the above, the player solicits the player reading the question with a bribe in exchange for assistance. The player reading the question could, in turn, accept the solicitation in the form of one of the above device assistance options. The option as selected corresponding to some sort of cost to the player may also be stored in the database 104 under the user ID table 106. For example, subject to the particular game play variation, there are a limited number of player aids available per game, for the sake of conforming to current denomination size or for the sake of convenience benefits etc. a debit score for the player (under the user ID table 106 in database 104) is maintained for the player. At step 240, the player submits an answer via the smartphone touchscreen display 116 and/or GUI interface 114 such as a voice recognition interface typically available as an application on the smart phone or tablet computer. Verification of the accuracy or inaccuracy of the player's answer is then determined at steps 242 to 252 by checking against the database 104 and providing the appropriate indication to the player.

Once the correctness of the answer to the question has been determined and provided to the player, the software application 102 may further determine at step 260 if point adjustments are needed based on the response. If so, the database 104 is queried at step 262 to determine the point adjustment. Also, if a debit event such as a tip was provided to the player prior to answering the question, determination of that event and (negative) value (price) of that debit event is determined by querying database 104 using user ID and question ID The player's scoring history is then updated as appropriate at steps 270-274 (FIG. 4D) with recalculation of score of overall user debit events as well as overall user score at step 274.

On the other hand, if the software application 102 is selected at step 232 to be used as an integral part of game play, the software application proceeds with game play at (b) as described above. As noted above, in accordance with the rules of the American Eagle vs. the Chinese Dragon board game's exemplary embodiment, players typically take turns answering a question that involves the current player shaking a pair of dice in a teapot, rolling them out on the table, using the (combined) number to determine how many spaces to advance the player's game piece on the board which in turn lands the game piece on one of five sequentially repetitive Chinese elements, namely, earth, wood, water, fire and metal. Five stacks of question cards are provided, one corresponding to each element and the content of which generally relates to the meaning of its corresponding elements, (for example, a game piece landing on a metal element space means the player must select a card from the metal element stack which pertains to industry and economics).

The software application 102 may be used in numerous ways to enhance normal game play. For example, as illustrated starting at (b) at step 232, the embodiment for using the software application 102 for game play includes the software application 102 reading the questions and maintaining the player's performance through the steps. The player must select or otherwise input the answer to the recited questions into the smartphone in order to ultimately maintain a verifiable record of game performance of each player. At the same time, the software application 102 may provide each player with direct response feedback regarding the correctness of player's' response, the correctness of responses to other players' responses, and the overall scores of players measured in money, power, influence, and (optionally) assets. In one version of the software application 102, the software application 102 maintains a record of each player that this player and not necessarily other players have access to. In any case, as in the (a) path from step 232, the player has a choice during game play to answer the question presented at step 240 if the player decides at step 254 that s/he knows the answer to the question, or the player may obtain assistance at step 238 if it is decided at step 256 that assistance is desired. As before, the software application 102 may keep track of such requests for assistance so that points may be debited or the number of assistance requests may be monitored and adjusted at step 258 and stored in the database 104.

Those skilled in the art will appreciate that the software application 102 may present the questions to smart phone's or tablet computer's touch screen display 116 for display and may selectively enable the following smartphone or tablet computer features:

1. Provide an audio-based pronunciation aid for Chinese words in the multiple choice answers or in the question using speech text module 122;

2. Provide a tip or a clue to the player in conjunction with a question using the speech text module 122 and/or the touch screen display 116;

3. Use the smartphone or tablet computer to search the Internet for supplementary information based upon a question and/or answer; and 4. Provide the player with supplementary textual or multimedia content that is, for example, pre-selected, reading indexable, and/or readily searchable (well tagged) and thus useful to augment the much more limited information in the answers or (in post answer context) the question itself.

With the exception of #2, the above question learning augmentation features may be utilized not only before but also after the question is answered. However, #4 is typically performed only after a question is answered (unless it is applied as part of the tip itself per #2).

As noted above, when the software application 102 is used for game play, the player typically reads the question card and scans the QR code or types in the question ID if the player feels that one or more of the smart phone software application features could facilitate the player's ability to answer the question correctly or confidently as referenced above when the player inputs the question card identifier by scanning the QR code (steps 210-216) or by inputting it manually (steps 218-222). If the player is confident about his/her sufficient command of the subject matter (Step 254 yes), or has chosen off line assistance (e.g., a bribe to another player, a plausible scenario for Step 256 no), and unless the player wishes to pull-up the question for purposes of reading it on the smartphone touchscreen screen display 116 or the player had (previously) chosen 232 option "b) integral part of game play," the player typically does not input the question card identifier into the system and may simply choose to proceed to the traditional mode by answering the question verbally in response to a verbal reading of the question. Typically, this verbal reading is by another player who also possesses the answer to the question. In any event, after the player provides the answer to the question and it is determined to be correct or incorrect at steps 242-252 and the scoring is updated at steps 260-274, the player may still wish to access supplementary on-line information about the question, the answer(s) or even the tip(s) at step 276 whereby such access being after the fact of answering the question would typically be accessible for no monetary cost. If the player chooses manual reading (instead of smartphone display), if the player chooses not to utilize supplementary information to assist in answering the question, or if the player chooses to manually have a question provided to him, answer it and determine its correctness, the above steps of FIGS. 4A-4D may not be necessarily required at all for game playing unless or until the player would desire to access supplementary information such as the word pronunciation aid and/or supplementary content about the questions at step 278, for example, as detailed above. Because these are provided after the question is answered, they would have no bearing on point score for the player. If, on the other hand, the player wishes to forego any supplementary information after the fact of answering the question and if the point scores are fully manually maintained (using distribution of money, power, and influence chips) and if in the variation where value changes according to the question wherein that value is printed on the question card, then the intervening use of the software application 102 is unnecessary. If, on the other hand, at any point (such as upon the reading of the question) the player wishes to access supplementary information such as word pronunciation or corresponding content to the question, she/he will scan the QR code of the question card or the player enters the alphanumeric question code on the card. In either case, the player may then request the preferred supplementary information from the database 104 at step 278 and typically would decide to return to manual reading (and continue game play normally in the off-line version; verifying answer correctness vis-a-vis other players).

The on-line version may be used for any one or a combination of the following play enhancement features consistently or on an as needed basis: (a) retrieving the question (including displaying via touch screen display 116 or reading it via speech to text module 122), (b) inputting the answer and retrieving the answer on record to verify correctness of the submitted answer, (c) keeping track of score of the player and/or other players (typically (b) is performed in conjunction therewith). Typically, however, the chips are denominated such that proper score keeping can be achieved manually by manual exchanging of chips as play occurs in real-time thus not requiring the on-line system implementation to track player scores. Monetary value which varies according to a question may be possible in the off-line version as well with some additional variations (or modifications) of denominational value of chips. This is because in order to keep the board game play as "traditional" and focused around the board as possible chips are typically used to keep track of player's scores.

Those skilled in the art will appreciate that application programs may also be downloaded to the player's handheld device that permit a child to better compete with adults (by downloading questions more appropriate based on the child's age and education level. The downloaded application program may also read the questions using proper Mandarin pronunciation when requested and supply additional questions at advanced levels of play once the available questions have been exhausted.

Game play continues until it is determined at step 280 that the bank is out of chips. If so, the players' points are compared against the rules and the game history is stored at step 282. The software application then ends at step 284 and, if not, only that round of play ends and the next round begins at step 208 as the next round of play begins as the process FIG. 4 *a* through *d*) repeats itself.

Game Contents

Second Embodiment

A second embodiment of the board game is entitled "The Silk Road" and is also designed for two to six players, preferably ages 16 to adult, or with younger players using a technique for handicapping the cards for that player to make play more evenly competitive. This embodiment which also allows for team play is similar to the first with a few noted changes in the game play and game elements. The contents of an exemplary game board include:

1. Game board: A map of China and surrounding bodies of water showing all provinces and small cultural representations of what the provinces are most known for (animals, cuisine, antiquities, infrastructure, ports, etc.) to create visual interest. The provinces will be numbered according to population. The game board takes the Five Elements (Wu Xing) representing category questions (described below) through the Silk Route pilgrimage throughout its ancient inland, mainland and maritime route beginning in Xi'an, China. The Silk Route passes through land and water superimposed as board movement squares on the map of modern China. The game squares are Wu Xing itself, e.g., the Five Elements going clockwise around the historic ancient Silk Route, as well as pearls, gems, pirates, bandits, the red phone, the Yellow Emperor, and the Panda, which will be discussed in more detail later. The Wu Xing characters themselves are artistically minimalist rendered in color coded Chinese characters representing Wood, Fire, Earth, Water and Metal as shown in the legend depicted in the game board rendering in FIG. 5. Color coded cards complementing the elements show the player which card to draw based on the roll of the die or dice. Game boards are generally printed 24 inches by 24 inches or less.

2. Guide Booklet: This booklet is a guide for use by each player to pronounce Pinyin names and places in the game and in the questions, as well as an overview of the original Silk Route. Other manifestations of modern or ancient commercial routes such as those noted above also may be employed.

3. Rules and basic Pinyin Pronunciation guide: The rules are printed on a Chinese Menu-style paper take-out flyer and include the game rules described below. The pronunciation guide is in the booklet or on a separate sheet of paper.

4. Two six-sided dice with a USA theme.

Figure 6:
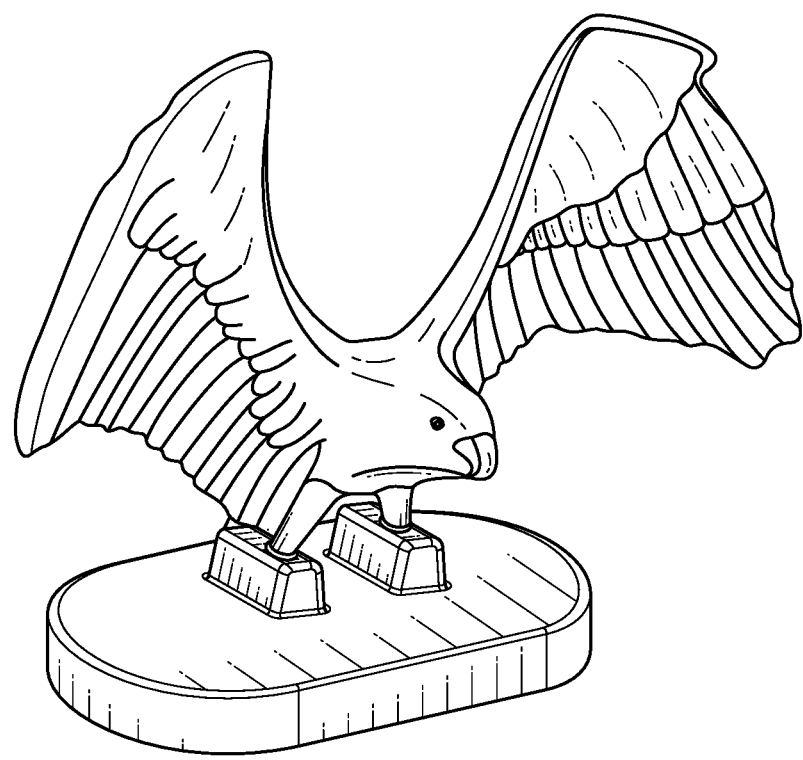
FIG. 6 illustrates an exemplary "American Eagle" game piece.

5. Six multi-color American Eagles tokens; red, blue, green, black, gold, and silver, all representing the United States. FIG. 6 illustrates an exemplary token.

6. 50 green stackable poker chips, representing Money in $1,000 denominations.

Figure 7A:
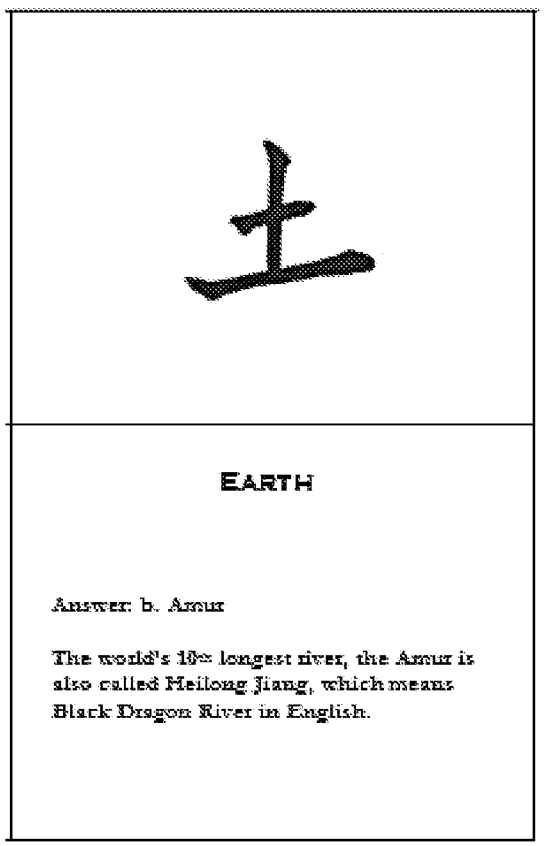
FIGS. 7A-7C are graphic renderings of sample game cards.
Figure 7B:
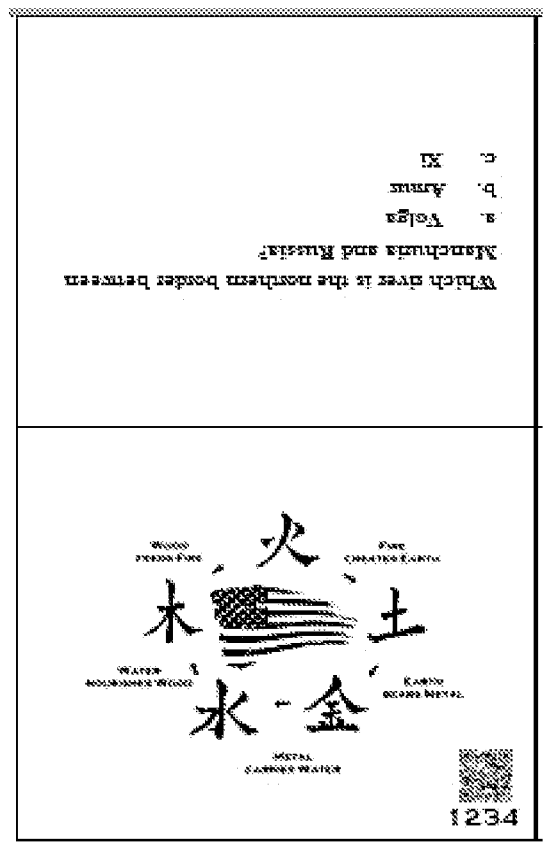
Figure 7C:
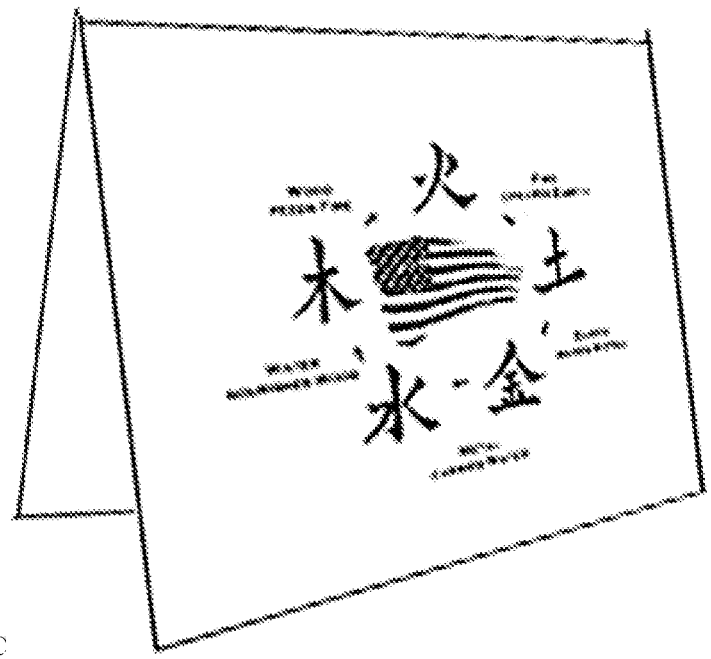

7. Question and answer cards, in 5 different elemental categories (Wu Xing) such as wood, metal, earth, fire, and water. The questions align to the meaning of the elements and encompass the categories of history (wood), culture (water), politics and military (fire), business, economics, and infrastructure (fire), etc. depending upon the type of educational content required to create integrated learning out of the elements of traditional Wu Xing. FIG. 7A illustrates the inside and FIG. 7B illustrates the outside of an exemplary game card as it would look flattened. FIG. 7C illustrates the folded card. When the designated reader is reading a question, other players see the Wu Xing. When the card is opened, the symbol for the element selected (in this example, Earth) would appear above the fold while the correct answer and expanded information would appear below.

8. 16 Red Phone Wild Cards: Red Phone Wild cards provide comical and/or reality-based scenarios to add levity and novelty to play. Players take the steps indicated to play out a diplomatic scenario, ending in a negative outcome.

9. A smart device or tablet computer software application is downloaded to read questions and possible answers as an aid in the pronunciation of Chinese words for American (non-Chinese speaking) players. The reading is performed using a speech to text module (See FIG. 3). The Chinese words are key terms and phrases in Pinyin and provide clues to other questions to advance around the board. The software application may be downloaded for free by purchasers of the game. Players who do not own the game may buy the software application or simply use the Guide Booklet to guide pronunciation of terms included in the game.

Rules of Game and Game Play

As with the first embodiment described above, the goal of the board game entitled "The Silk Road" is to excite, educate, teach and instill a curiosity about other cultures and countries (in this case China) by asking questions about China that respect the country and its citizens and provide advancement in game play for showing an understanding of China and its geography and culture. The players of the game follow the country's interior and maritime Silk Route as the earliest example of interior globalization in this case and commercialization and a guide to the world's most populous country, as well as a country of great geopolitical significance.

Players learn contextual facts about modern and historical China in an integrated way through an integrated development of questions—history, terrain, economic significance, and politics, diplomacy, natural resources, economics and biodiversity while having fun and using their smart devices or tablet computers master pronunciation of both important and common names and places. Players accumulate wealth, (and in some alternative variations, also power and influence), in order to win. Americans in the form of Eagles tokens of different colors compete against one another on Chinese terrain. Winning through knowledge about China is key; if players do not know the answer to a question, players may attempt to bribe another player to eliminate one of the incorrect answers, for a price. If they fail to answer questions and lose their chips, they end up in debtor's prison and may re-enter play on the Yellow Emperor square after rolling an even number.

Set-Up:

The players begin play as follows:
1. The players choose a banker. The banker is in charge of the Money chips The banker gives three money chips to each player and puts aside any extras to be used during gameplay.
2. The players choose a designated reader to read the questions.
3. Each player chooses one Eagle token, and places it on the board on the square marked "Start," which is the Yellow Emperor of the Xi'an, where the Silk Route started.
4. Players roll the dice once. One or two die are used to accelerate board movement as desired. The player who rolled the highest number goes first. If the highest roll is a tie, each of the tied players roll again until one player emerges with the highest number. That player then goes first. Play proceeds clockwise amongst the players. Players may play with a partner or in teams as desired.

Question and Answer Cards:

The question cards are divided into five categories representing the Chinese symbols of Wu Xing meaning "elements." (http://en.wikipedia.org/wiki/Wu_Xing) An artistic rendering of all the elements appears on the back of the card, and a rendering of the appropriate element appears on the inside of each card as illustrated in FIG. 7. As an example, illustrations of such artistic renderings may be found at http://chemistry.about.com/od/historyofchemistry/ss/Five-Element-Symbols-Wu-Xing.htm. In an exemplary embodiment, the cards represent the following elements:

(card color brown) WOOD: Modern History and Politics 1911-1949;

(card color gray) METAL: Business/economics;

(card color green) EARTH: topography/geography/terrain/natural resources/infrastructure/biodiversity;

(card color red) FIRE: Modern politics/foreign policy/military, 1949-present;

(card color blue) WATER: culture, religion, and philosophy.

As in the first embodiment, the corresponding categories may be different for games built around other regions or traditions. For example, a game based in Israel or around the Jewish diaspora could use Wu Xing metaphors around the Torah including rock, light, path, shield, and sword. The same could apply to modern Christian biblical history in the Middle East with corresponding symbols.

Each card (FIG. 7) contains a question with multiple choice or true/false answers. The card opens up to reveal the correct answer as well as additional information about the subject matter in most cases. In some cases, straightforward questions do not call for additional amplification. A correct answer earns a money chip, or alternatively, in a variation where power and influence chips are used, a correct answer would earn the chip indicated on the card. If the player answers incorrectly, the players loses a money chip (or power or influence chips) to the bank and the player's turn ends.

Red Phone "Wild" Cards:

A red phone is a sign of status in Communist China American competition through knowledge of China is the focus of this game. Therefore, if a player lands on a Red Phone Card space, the player must take a Red Phone Card from the box. The Red Phone Cards provide diplomatic conflict situations for the player that must be resolved by loss of chips. In this game, all Red Phone Cards end the player's turn. Sample Red Phone Cards are provided above in the explanation of the first embodiment.

Pearl, Gem, Bandit, or Pirate Squares

If the player lands on a pearl or a gem, the player wins a money chip and rolls again. If the player lands on a pirate or a bandit, the player to the left gets to pick the Wu Xing elements question category. If the first player answers incorrectly, he/she pays one money chip to the player who chose the category.

Game Play

During play of the game, each player moves his/her Eagle token in accordance with the roll of the dice. The player may choose to roll one or two dice as desired. The designated reader will take the question and answer card from the box of questions corresponding to the Wu Xing element of the space landed on and ask the question of the player who moved the Eagle token. The correct answer is indicated on the inside of the card. The first player, let's call him or her Player 1, rolls the dice once and moves his/her chip the combined number of spaces indicated on the dice. The designated reader, let's call him or her Player 2, takes one card from the box of question and answer cards, relating to the space where Player 1 landed. For example, if Player 1 begins on the "Start" space, and rolls "one" on the die, Player 1 will move to Category I, Modern Chinese History Since 1911. Player 2 will ask a question from the Category I section of the card box. After the question has been answered, the reader opens the card to reveal the correct answer and reads the optional expansion section, which gives more details about the subject matter. Then the card is removed from play. If Player 1 answers correctly, the banker will give the player a money chip. Player 1 takes the chip and places it on the board under the player's token. In an exemplary embodiment, the chips and Eagle tokens are stackable so that players may see who is winning and who is losing at a glance. Player 1 then rolls again and the play continues, again, answering a question from the category indicated by the space landed upon. If the player gives an incorrect answer, the player surrenders a chip to the bank, and the player's turn ends. Play then continues to the player on the left. For each player's turn, the die is rolled once and the player moves his or her token, then answers questions. If the player lands on the Red Phone Card space, player must take a card from the Red Phone Cards. The card must be read aloud and the actions indicated must be taken. After the actions have been taken, the player's turn ends, and play again moves to the left. On the other hand, if the player lands on a pearl or a gem or some other reward space, the player wins a money chip or other prize and rolls again. Similarly, if the player lands on a pirate or a bandit, the player's opponent (person to the left of the player or other designated player) picks the Wu Xing elements question category for the player. If the player answers incorrectly, the player must pay a money chip to his or her opponent. Bankrupted players go to Debtor's Prison and rejoin the board at the Yellow Emperor after rolling an even number. The banker then gives the player two chips.

When a player is stumped for an answer, and wishes to, the player may attempt to "bribe" another player (e.g., the reader) to narrow down the answer. Bribes are paid for by money chips. Player 1 may negotiate the cost of the bribe with Player 2, up to the total number of money chips that Player 1 possesses. Both players must agree on the bribe. If Player 1 bribes Player 2, the agreed amount of chips goes into Player 2's pile. Player 2 then repeats the question, removing one possible incorrect answer. For example, if the answer is "a", the player, after being bribed, will repeat the "a" and either "b" or "c" choices. If Player 1 answers correctly, the reward is still a Money chip and the players exchange the terms of the bribe plus one chip from the Banker; incorrectly, the consequence is still to lose a money chip to the bank.

After each player has had one turn, a player with no Money chips is sent immediately to the Debtor's Prison. The Player does not roll or move their Eagle token; however, that player can still be bribed by another player. If the player in Debtor's Prison is bribed, the player may move from Debtor's Prison and go back into play. The debtor is in a worse overall position while the other player is in a better one the fact that the debtor now has gained one chip (versus previously none) entitles him to leave prison through the resumption of play which may be a reasonable exchange.

To Win

The game ends when the player with the most money chips lands on the Yellow Emperor or Panda square. On the other hand, the players may agree to quit before landing on the Yellow Emperor or Panda square, in which case the player with the most money wins.

Those skilled in the art will appreciate that other novel variations of board game design may be gainfully implemented in conjunction with the novel features of the herein proposed board game system, so as not to limit the potential scope of such additional variations to the currently proposed board game. For example, some variations could include Power and Influence chips in addition to Money chips (mentioned above). Additionally, attempts could be made to include more items and aspects from modern Chinese culture into play. For example, players who are in debtor's prison may be forced to wear fingercuffs as in the first embodiment until they roll an even number and are released. The dice also could be rolled out of a Chinese teapot as in the first embodiment.

As in the first embodiment, there could be different versions of the board game that vary in design by age group of the players e.g., children, youth (middle school) and adult (sixteen and older) or by explicit skill level (e.g., beginner, novice, advanced, expert), which alternatively could be ranked according to terms corresponding to a type of Chinese ranking system measuring degree of skill or mastery of a discipline. In a similarly related variation, play could be adapted to enable different ages (or specific skill levels) to be able to play together while adjusting for the innate differences in their competitive abilities. For example, a family with adults, grade school age children and younger children could, in principle, play the game together and be relatively evenly matched from a competitive standpoint if players from each age group only selected cards from a stack that corresponded to their own age group (in accordance with a decreasing handicap corresponding to decreasing age or skill level). Another way to account for various player handicaps, age or skill, would be to give certain players an additional chance to answer a question if initially answered incorrectly. This could be limited to a certain number of "do-overs" per player or round. Another variation to even out gameplay when players have different skill levels is to start players with a different number of chips; for example, skilled players could begin the game with 3 chips while novice players may begin with 5. Instead of starting with different number of chips, one could add chips when a lower level player answers correctly and not remove them when that person answers incorrectly. In the variation where score value is attributed to a question, that value could vary by the question's level of difficulty. The amount of value may be proportionately greater for the less skilled player, and vice versa. Also, each card could have questions of differing degrees of difficulty and differing value that the player could select to maximize his or her opportunity to obtain chips.

The Smart device or Tablet Software Application

As in the first embodiment, the "The Silk Road" smart device or tablet computer software application is downloaded by one or more game players and registered to the game player for free when the game is purchased or for a one-time download fee along with renewal fees for updates, expanded content, or on-going subscription. It should be noted that the software application 102 could conceivably be employed on multiple platforms, including, but not limited to "smart devices" including smart phones, tablet computers, personal computers, iPods, smart TV's, e-readers, video game systems, etc., although the smart phone or tablet computers are particularly well suited to use with the board game because of their portability, convenience, touch screen, and scanning capabilities. The following illustration of this service is simply one example of numerous potential ways in which the features of such software applications may be implemented in conventional smart devices or tablet computers to both enhance and facilitate the learning and entertainment objectives of a board game such as the board game described above. The software application offers additional game play features by providing supplemental sources of information that are flexible, convenient, on-demand, and in a highly appealing format for the player. In the context of the game play described above, the software application provides enhanced explanations to questions, additional questions, options for expanded or handicapped questions, and descriptions and pronunciation aids to Chinese words to further engage, enhance and enrich the experience of board game players using smartphones, tablet computers, or related mobile devices. In an exemplary embodiment, "bribes" are optionally available by which the player can negotiate with another player of choice an amount of money chips in exchange for removal of one of the wrong answers associated with the question.

As with the first embodiment, the primary purpose of a software application in accordance with second embodiment of the invention is to further enhance the entertainment appeal of a learning-oriented game in a popularly viable way and to thereby provide further utility in the game play endeavor. As with the first embodiment, the software application may be embodied in a smart device or tablet computer 100 having the hardware and software features shown in FIG. 3 and described above.

FIGS. 8A-8E together illustrate the information flow from the start to the completion of the player's engagement of the software application 102 for typical use in the game play described above, for example. Once the software application 102 has been downloaded, the software application 102 is accessed at 802. The user sign-in process proceeds at step 804 by enabling the application server 120 to access informational content accessible to the software application 102 as stored in database 104 to verify registration of the user. For example, the user may be authenticated by presenting a digital certificate to the application server 120 which, in turn, authenticates the registered user and current valid registration status of the user with the game service. The verification of these requirements sent back to the software application 102 allows the user to then proceed with logging in individual players and making game selections at 806-807 (game selections may include options such as whether game play will proceed with or without the physical game board, whether individual players will be using expanded or handicapped questions, or in a variation from the exemplary embodiment, whether players will be playing multiplayer on multiple devices, screen sharing, and whether players will have access to a running total of all players' scores during game play or only upon completion of the game) that are stored in the player sequence and score database 130. The player begins using the game service at step 808 located on the application server 120 as well as the software application 102 itself installed on the player's smart device or tablet computer 100. All of the players' identities are typically input into the same smart device or tablet device 100, although each player could play using his or her own individual smart device or tablet computer 100.

Figure 8A:
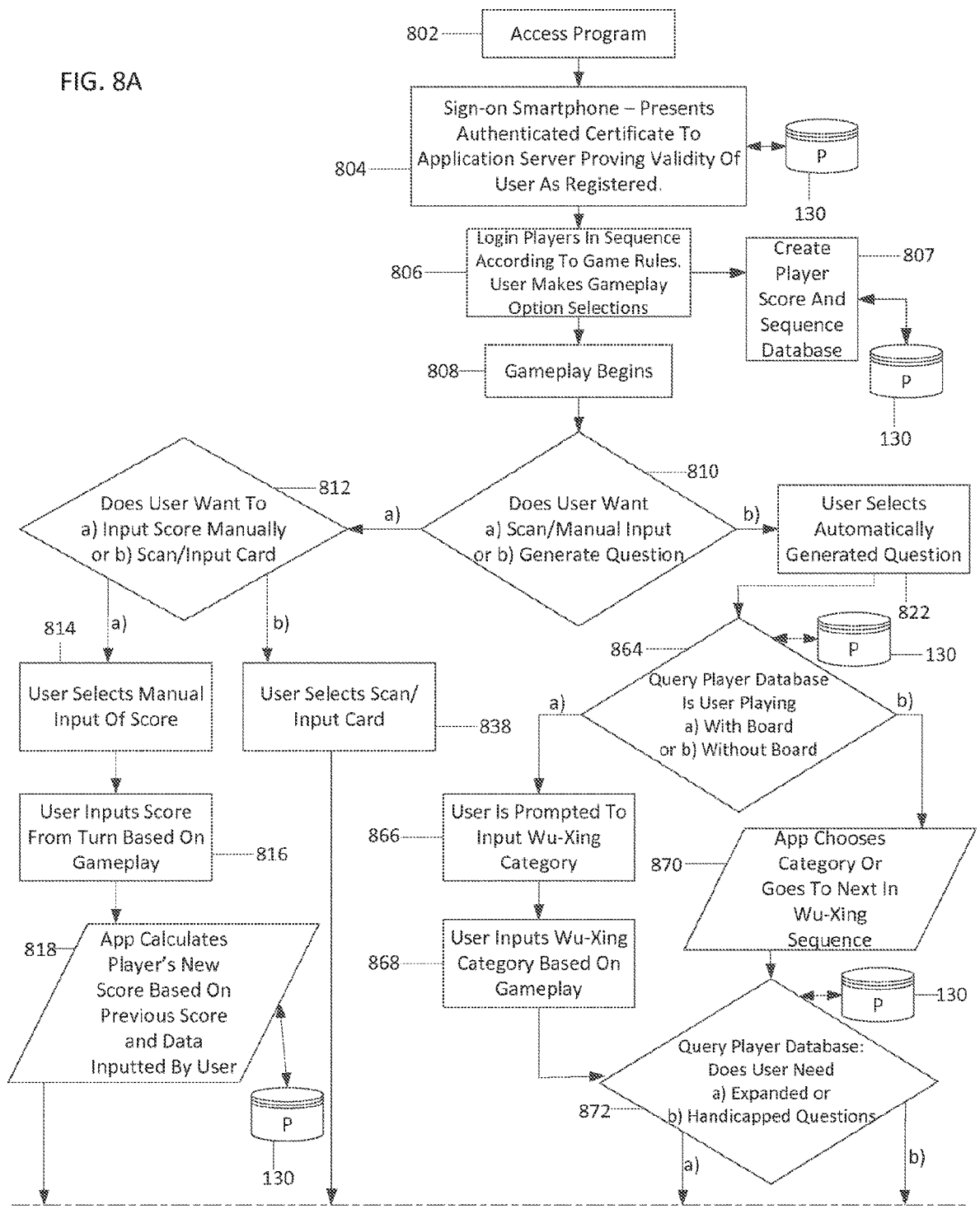
FIGS. 8A-8E together illustrate a sample software flow for a software application that runs on a smart device or tablet computer for enhancing game play in further exemplary embodiments of the invention.

As indicated in FIG. 8A, game play begins at step 808 along with other players participating in the game (who also follow the same process of initiating and enabling use of the software application 102 as appropriate depending on game option selections). In like fashion to board game style play, each of the players follows each other sequentially waiting for his/her turn in a given round of play. In the illustrative embodiment, all the players' identities are inputted on the same device, however each player could play using his/her individual smart device or tablet computer 100. Whether he/she takes advantage of using the software application 102 typically depends initially upon player preference and the player's own command of the material as it relates the question content on the card which the player ends up drawing and whether in the player's opinion the software application 102 could enhance the likelihood of his/her being able to answer the question correctly. If the player chooses to use the software application 102, the player may then follow the prompts on the software application 102 to step 810 where the player is given the option to a) scan or manually input the question cards or player score for the round or alternatively to b) invoke the system to generate the questions automatically. If the player elects option a) at 812 the user may elect to input a score manually for manual entry at 814 if no assistance from the software application 102 is needed, and to preserve accurate scorekeeping at 816, as some events that may affect score are not associated with a question card (for example, if the player lands on a gem or pearl space). The software application 102 calculates the player's new score based on the previous score and the data input by the user at 818 for storage in the player sequence and score database 130. On the other hand, the user may elect at 812 to scan the card or input identifying information (question identifier) associated with the question card (via QR code or alphanumeric entry) to begin his/her turn at 820. Conversely, at 810 the user may elect for the software application 102 to generate a question at step 822. On each turn, the player would choose the appropriate action at 810 based on gameplay; for example, if the player lands on one of the Wu Xing elements, that player might choose to scan their card with a QR code reader, steps 838-842. On that same player's next turn, he/she could land on a pearl space and would then elect to enter his/her score manually at 814.

The conditions by which the manual process 814 may be used would be the following: 1. if there is no handicapping of the questions; 2. if the expansion questions are not utilized; 3. if the player lands on a pearl, gem, Yellow Emperor, Panda, or Red Phone Wild Card square; 4. if the player begins his/her turn in Debtors' Prison; 5. if the player decides not to utilize the app to answer their question and instead wants to enter their score manually; 6. and/or if players are utilizing the software application for scorekeeping only (playing without chips). At 816, the user inputs his/her score alphanumerically using the touch screen display 116 based on points earned or lost during gameplay. The software application 102 queries the sequence and score table of database 130 and determines at 824 (FIG. 8E) if the player has the highest score. If yes, at step 826, if the player has landed on the Yellow Emperor or Panda square, the user inputs that fact at 828 and the game ends at 830. The player wins. If the player does not have the highest score at 824 the player's turn ends at 832 and at 834 the software application 102 queries the sequence and score table of database 130 to find the next player in sequence at 836, who begins his/her turn at 810.

Figure 8B:
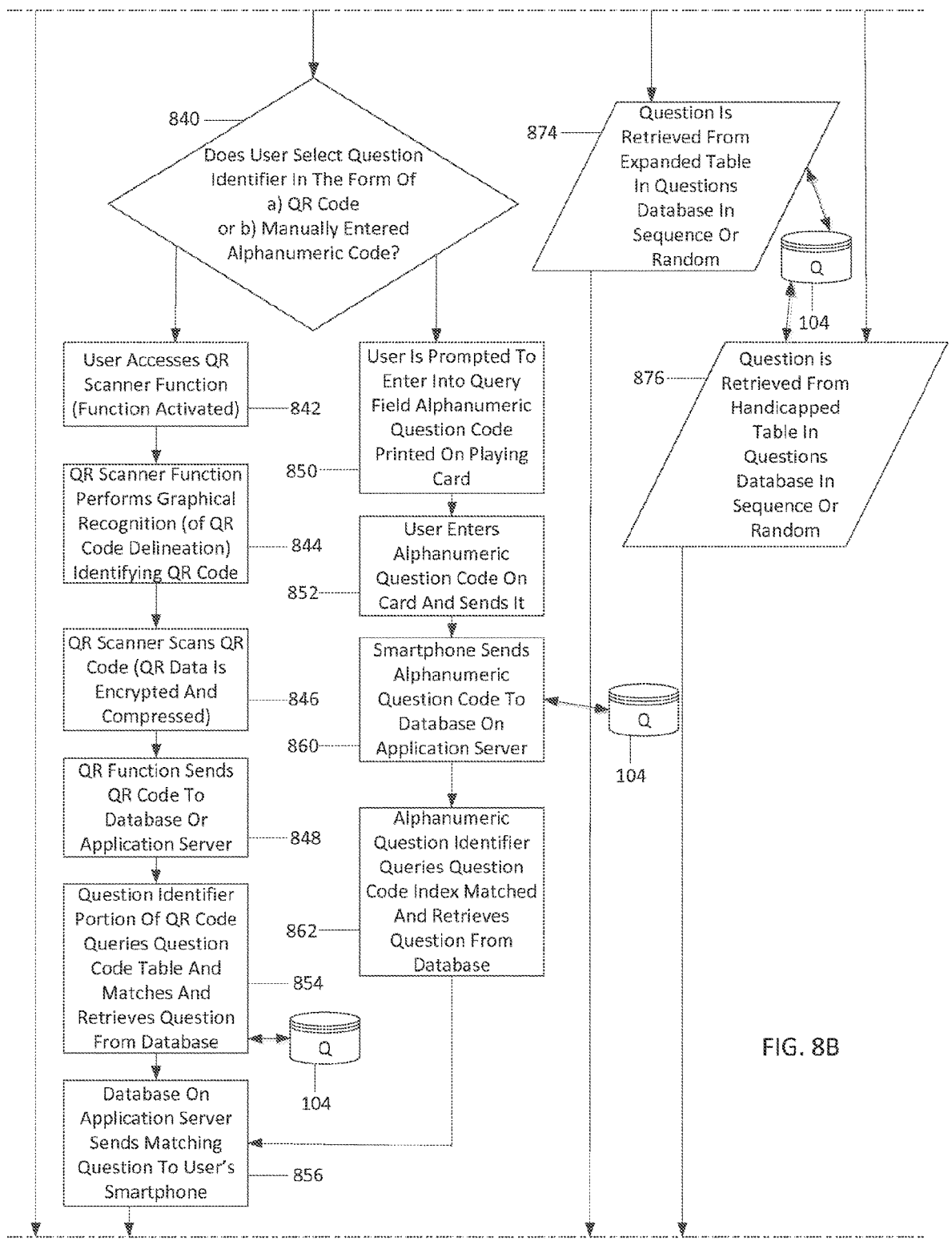
Figure 8C:
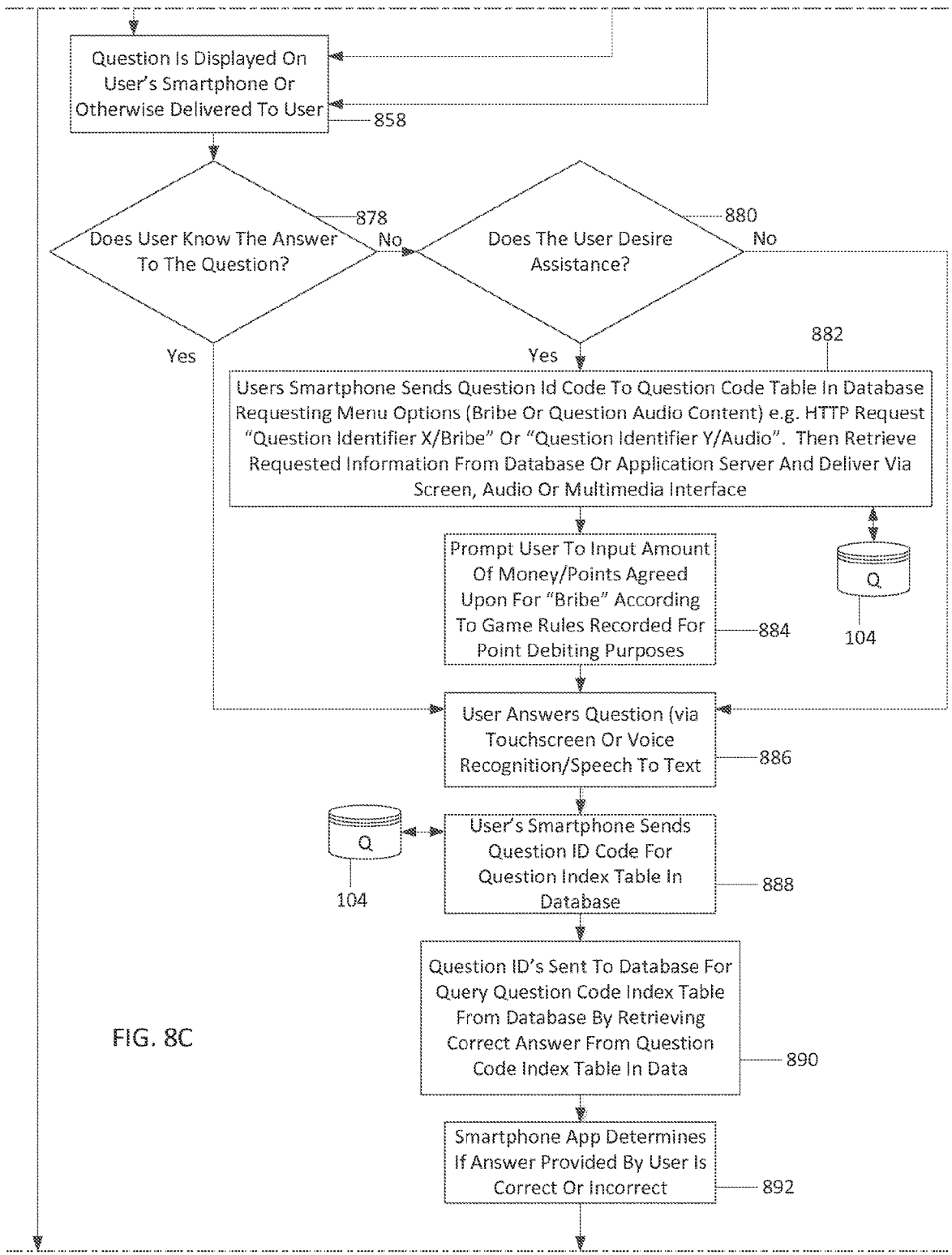
Figure 8D:
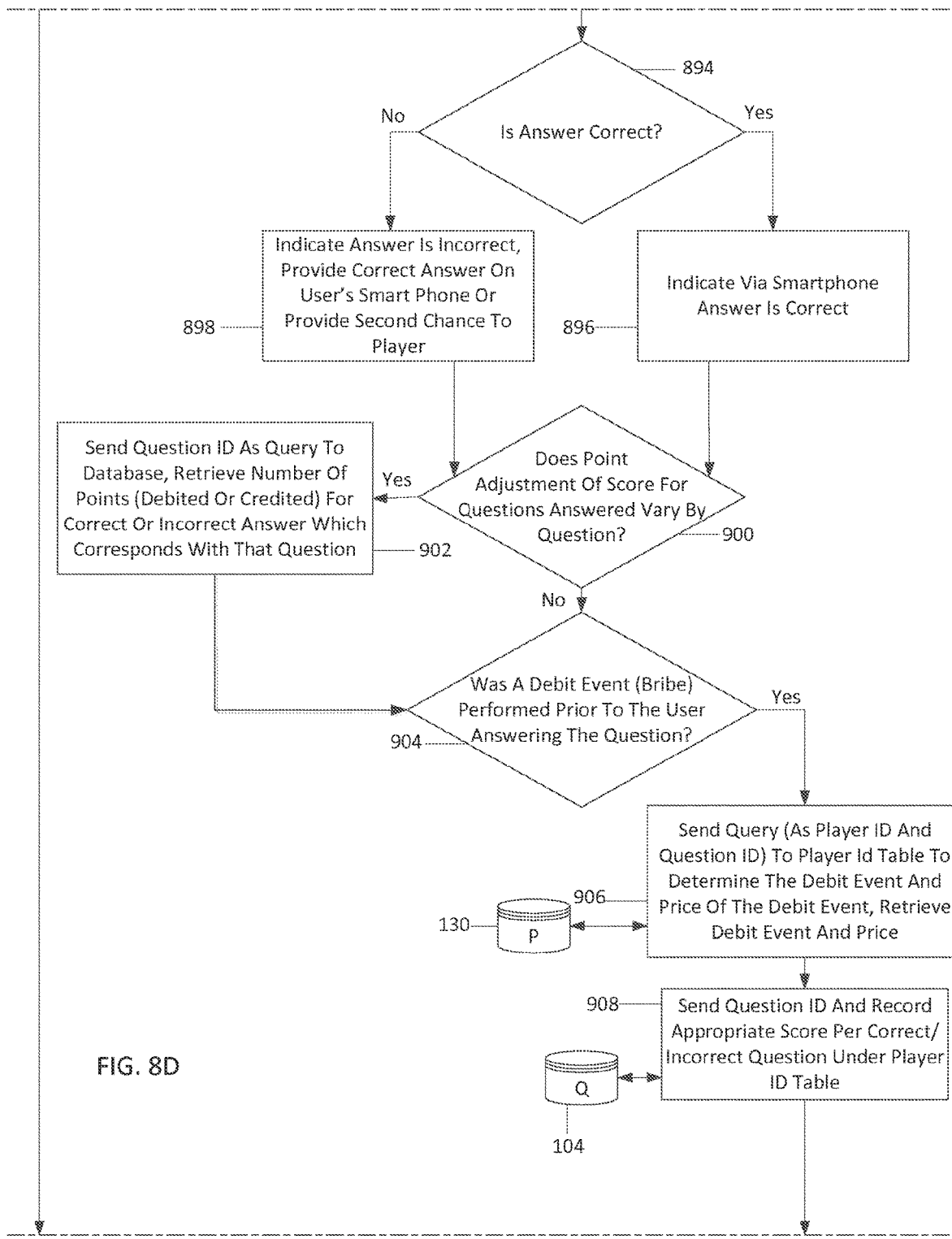
Figure 8E:
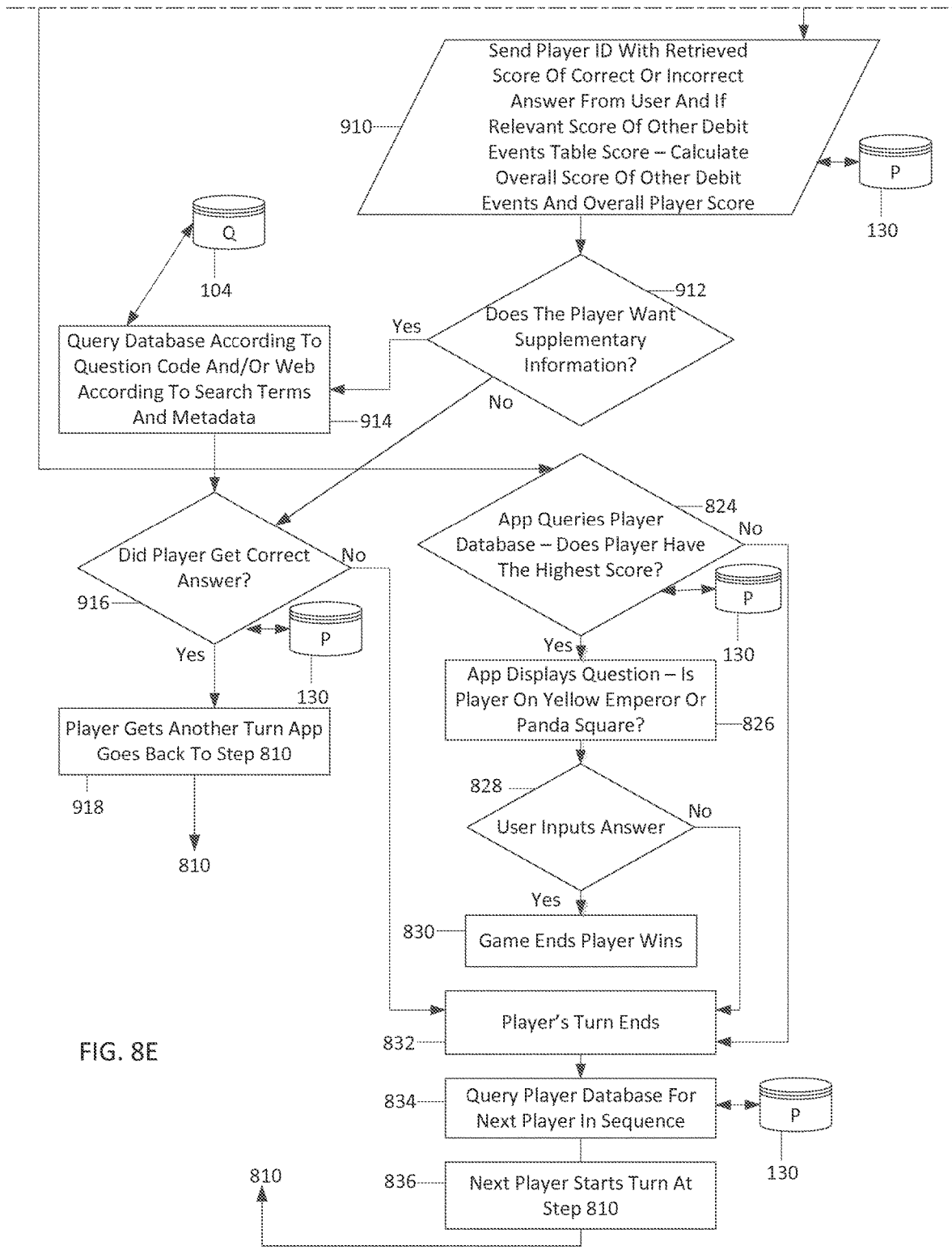

In the case that the player has selected to input the question identifier from the appropriate card into the software application at 838, information may be inputted into the software application 102 typically one of two ways (or optionally to the player) as determined at 840 (FIG. 8B). The player may utilize the camera input on the smart device or tablet computer 100 to scan a QR code on the card (see FIG. 7B) (a portion of which contains the question identifier) at steps 842-848, where the scanning/encoding and communicating question identifier provided to the database 104 is located on the application server 120. On the other hand, at step 850 the player may be prompted to enter the alphanumeric question ID printed on the playing card and/or other data into a query field for the software application 102. At step 852, the player may input the question identifier by entering an alphanumeric code printed on the card as depicted and the alphanumeric question code is communicated to the database 104. The player would typically use the touch screen display 116 to enter the alphanumeric code.

At step 854, the process for information retrieval is performed whereby the question identifier portion of the QR code queries the question code table 108 of the database 104 on the application server 120 for the software application 102 in order to retrieve the question corresponding to the player's playing card at step 856. Typically, at step 858 (FIG. 8C) the player may confirm successful delivery of the correctly matching question by displaying it upon the player's smart device screen 116. Similarly, the alphanumeric question ID may be used at step 862 to query the question code table of the database 104 on the application server 120 for the software application 102 based on manually entered user data from step 860.

On the other hand, if the player selects at step 822 to have questions automatically generated, the path would diverge at 864 depending on whether the player is using a playing board, a selection that was inputted by the user at step 806. If a board is being used, the player is prompted at 866 to input the Wu Xing category which is entered at 868 based on the space where the player lands on his turn. If no board is being used, the software application 102 chooses the category or goes to the next Wu Xing category in sequence at 870. For the selected Wu Xing category, the information path diverges again at 872, depending on whether the player indicated at 806 that he/she would prefer expanded or handicapped questions. If an expanded question is needed, the question is retrieved at 874 (FIG. 8B) from an expanded table in questions database 104, is provided in sequence, or randomly. On the other hand, if a handicapped question is selected, the question is retrieved at 876 (FIG. 8B) from the handicapped table in questions database 104, is provided in sequence, or randomly. In either case, the question is displayed on the player's smart device screen 116 at step 858.

At 878, after the player has read the question, he/she can decide at 880 if any assistance will be needed. If the player is convinced s/he can answer the question in a satisfactory manner at step 878, typically no other assistance that the software application 102 can provide will be necessary. On the other hand, if the player instead is not confident that s/he knows (or fully understands) the question, s/he may then consider the next decision step 284 which is whether s/he desires assistance from the software application 102. As noted above, during basic game play of a game such as The Silk Road, absent the incorporation of the software application 102 in board game play, the player who is stumped or unsure of the answer has the option of bribing the player reading the question to him/her with money chips. For example, the player may not know the answer to the question ("no" at step 878) and then s/he must decide whether to utilize the software application 102 assistance at 880 to obtain aid. In the exemplary embodiment, the player may request audio/pronunciation aid or may utilize the "bribe" function via the software application 102 at 882. Additional aids may be available at step 882 in varying embodiments, including tips, clues, further explanation of different answers, or other such aids; making use of these options may cost points in the form of money chips. If the player desires assistance ("yes" at step 880) the software application 102 retrieves the options for assistance at 882 according to those recorded under the table entry in the question ID table in the database 104 (typically unique to that particular question). In the exemplary embodiment, this would constitute taking advantage of the "bribe" option, which would eliminate one of the incorrect answers. The player would be prompted at step 884 to enter alphanumerically the amount of money chips wagered in the bribe, according to the game rules. A debit score for the player (under the player sequence and score database 130) is maintained. At step 886, the player submits an answer via the smart device touchscreen display 116 and/or GUI interface 114 such as a voice recognition interface typically available as an application on the smart device or tablet computer 100. Verification of the accuracy or inaccuracy of the player's answer is then determined by checking against the questions index table in database 104 at step 888. The question ID for the query is used to retrieve the correct answer from the question code index table in the database 104 at 890. The software application 102 then determines if the answer is correct or not at 892, and if determined to be correct at step 894 (FIG. 8D), indicating same to the player via his/her smart device display at 896. If the answer is incorrect, the player is so notified via his/her smart device display and given the correct answer at 898. Alternatively, the player is given a second chance to answer the question.

Once the correctness of the answer to the question has been determined and provided to the player, the software application 102 may further determine at step 900 if point adjustments are needed based on the response. In exemplary embodiments, the software application 102 may perform point adjustment of scores for questions that are weighted differently according to the difficulty of the question at step 900. For example, the score for each correct answer would be maintained in the question table in database 104 to account for the different weightings for game questions. If point adjustments are needed, the database 104 is queried using the question ID at step 902 to determine the point adjustment. The number of points to be debited or credited is retrieved for the correct or incorrect answer corresponding to the question ID at step 902. Also, if the predetermination of a debit event such as a bribe prior to the player answering the question is determined at 904 to have occurred, the calculated outcome of that event and (negative) value (price) of that debit event is determined by querying database 130 using player ID and question ID to retrieve the score from the question table and to record the appropriate score for each correct or incorrect question under the player ID in the database at steps 906-910 (FIG. 8E) with recalculation of score of overall user debit events as well as overall user score at step 910. At step 912, the player is prompted whether he or she requests supplementary information relating to the content of the answer and/or question. If yes, the question table in database 104 is queried and/or an outbound query to a web server associated with a search engine using the appropriate search terms and metadata is performed at 914 to retrieve additional corresponding information. That information is then displayed and/or read by the smart device. This information may be delivered via streaming audio or text-to-speech algorithm or using multimedia components including video on the user's smart device. After the player has finished with any supplementary information or if they decided to skip it, the player table in database 130 is queried at 916 to determine if the player got the answer correct; if yes (step 918), player gets another turn and the software application 102 returns to step 810. If no, the player turn ends at step 832. Once the player's turn is over, the player sequence and score table in database 130 is queried to determine the next player in sequence at step 834. At step 36, the next player starts his or her turn at step 810, repeating the sequence. This process will continue as a recursive loop until one of the players wins by having the highest score and landing on the Yellow Emperor or Panda square, which is entered into the software application 102 through the manual process that has been previously discussed.

The conditions typically by which the players would elect to automatically generate the questions would be one or more of the following scenarios: 1. the players have played through all the cards included in the board game, typically after multiple game play sessions or the players simply prefer to play without cards; 2. the condition in which players of one or more skill levels are competing against one another and it is desirable to handicap questions for typically novice players or alternatively a highly skilled player, for example, such that the competitive ability of all players is reasonably equitable; 3. other alternative variations described in the Alternative Variations of Software Application That Apply to On-line Variations section, such as playing without the board, e.g. a travel version in which multiple players or solitaire may be implemented, or where the players are physically separated from each other. (Note: at step 806 when players sign in they will be asked if they will be playing with or without the board.)

As noted above, in accordance with the rules of the Silk Road board game's exemplary embodiment, players typically take turns answering a question that involves the current player rolling a pair of dice using the (combined) number to determine how many spaces to advance the player's game piece on the board which in turn lands the game piece on one of five sequentially repetitive Chinese elements, namely, earth, wood, water, fire and metal. Five stacks of question cards are provided, one corresponding to each element and the content of which generally relates to the meaning of its corresponding elements, (for example, a game piece landing on a metal element space means the player must select a card from the metal element stack which pertains to industry and economics).

The software application 102 may be used in numerous ways to enhance normal game play. For example, as illustrated starting at (b) at step 810, the embodiment for using the software application 102 for game play includes the software application 102 reading or generating the questions and maintaining the player's performance through the steps. The player must select or otherwise input the answer to the recited questions into the smart device in order to ultimately maintain a verifiable record of game performance of each player. At the same time, the software application 102 may provide each player with direct response feedback regarding the correctness of player's' response, the correctness of responses to other players' questions, and the overall scores of players measured in money chips. In one version of the software application 102, the software application 102 maintains a record of each player that this player and not necessarily other players have access to. In any case, as in the (a) path from step 810, the player has a choice during game play to answer the question presented using touch-screen, voice recognition, or speech to text at step 886 if the player decides at step 878 that s/he knows the answer to the question, or the player may obtain assistance at step 882 if it is decided at step 880 that assistance is desired. The software application 102 may keep track of such requests for assistance so that points may be debited or the number of assistance requests may be monitored and adjusted at step 884 and stored in the database 104. If players decide they do not wish to use the software application 102 as an integral part of game play (i.e. for keeping score or generating questions), they could use the application simply for supplementary information purposes only following the path b) at 812. This would allow players to enjoy enhanced multimedia content while playing with the game board.

Those skilled in the art will appreciate that the software application 102 may present the questions to smart device's or tablet computer's touch screen display 116 for display and may selectively enable the following smart device or tablet computer features:

1. Provide an audio-based pronunciation aid for Chinese words in the multiple choice answers or in the question using speech text module 122 and/or reading the question in its entirety;

2. Provide a "bribe" opportunity, tip, or a clue to the player in conjunction with a question using the speech text module 122 and/or the touch screen display 116;

3. Use the smart device or tablet computer to search the Internet for supplementary information based upon a question and/or answer;

4. Provide the player with supplementary textual or multimedia content that is, for example, pre-selected, reading indexable, and/or readily searchable (well tagged) and thus useful to augment the much more limited information in the answers or (in post answer context) the question itself. In a variation, multimedia content can even be associated with the question.

Items 1 and 2 of the above question learning augmentation features may be utilized before the question is answered, while items 3 and 4 would typically be performed only after the question is answered (unless it is applied as part of the tip itself per item 2).

As noted above, when the software application 102 is used for game play, the player may choose to read the question card and scan the QR code or type in the question ID at 840 if the player feels that one or more of the smart device software application features could facilitate the player's ability to answer the question correctly or confidently as referenced above when the player inputs the question card identifier by scanning the QR code (steps 842-854) or by inputting it manually (steps 850-862). If the player is confident about his/her sufficient command of the subject matter (yes at 878), or has chosen off line assistance (e.g., a bribe to another player, a plausible scenario for Step 880), and unless the player wishes to pull-up the question for purposes of reading it on the smart device touchscreen screen display 116 the player typically does not input the question card identifier into the system and may simply choose to proceed to the traditional mode by answering the question verbally in response to a verbal reading of the question. However, the player would need to manually enter his/her score on the software application step 816 to maintain accurate scorekeeping. Typically, this verbal reading is by another player who also possesses the answer to the question, the designated reader or the person chosen by player 1 to receive a bribe. In any event, after the player provides the answer to the question and it is determined to be correct or incorrect at steps 888-898 and the scoring is updated at steps 900-910, the player may still wish to access supplementary on-line information about the question or the answer(s) at step 912 whereby such access being after the fact of answering the question would typically be accessible for no monetary cost. If the player chooses manual reading of the game cards (instead of smart device display/reading), if the player chooses not to utilize supplementary information to assist in answering the question, or if the player chooses to manually have a question provided to him, answer it and determine its correctness, the above steps of FIGS. 8A-8E may not be necessarily required at all for game playing unless or until the player would desire to access supplementary information such as the word pronunciation aid and/or supplementary content about the questions at step 912, for example, as detailed above. Because these are provided after the question is answered, they would have no bearing on point score for the player. If, on the other hand, the player wishes to forego any supplementary information after the fact of answering the question and if the point scores are fully manually maintained (using distribution of money chips) and if in the variation from the exemplary embodiment where value changes according to the question wherein that value is printed on the question card, then the intervening use of the software application 102 is unnecessary. If at any point (such as upon the reading of the question) the player wishes to access supplementary information such as word pronunciation or corresponding content to the question, she/he will scan the QR code of the question card or the player enters the alphanumeric question code on the card. In either case, the player may then request the preferred supplementary information from the database 104 at step 912 and typically would decide to return to manual reading (and continue game play normally in the off-line version; verifying answer correctness vis-à-vis other players).

The on-line version may be used for any one or a combination of the following play enhancement features consistently or on an as needed basis: (a) retrieving the question (including displaying via touch screen display 116 or reading it via speech to text module 122), (b) inputting the answer and retrieving the answer on record to verify correctness of the submitted answer, (c) keeping track of score of the player and/or other players (typically (b) is performed in conjunction therewith). Typically, however, the chips are denominated such that proper score keeping can be achieved manually by manual exchanging of chips as play occurs in real-time thus not requiring the on-line system implementation to track player scores. A deviation and possible variation of the exemplary embodiment would allow for a monetary value which varies according to a question in the off-line version as well with some additional variations (or modifications) of denominational value of chips. This is because in order to keep the board game play as "traditional" and focused around the board as possible, chips are typically used to keep track of player's scores.

Game play continues until the high scoring player lands on the Yellow Emperor or the Panda square on the game board (826). If so, the players' points are compared against the rules and the game history is stored at step 884. The software application then ends at step 830 and, if not, only that round of play ends and the next round begins at step 836, and the next round of play begins as the process of FIGS. 8A-8E repeats itself.

Alternative Variations of Software Application that Apply to On-Line Variations

If players wish to trust the integrity of one another, scorekeeping may be performed using the smart device or tablet computer 100 exclusively. Each player could be responsible for his/her own scorekeeping but a more user friendly approach would allow one player to be a designated score keeper who is responsible for inputting all score modifying events or for question answer scoring updates and for debiting player scores for tips. A less important variation could employ the designated scorekeeper to keep track of the score in order to verify accuracy and trustworthiness of players receiving and returning chips to the stack. In another key variation of game play, each player keeping an on-line version of his/her score is essential inasmuch as a separate score which is visible and accessible to other players may be different than the score which each player keeps for him/herself by design. The visible (or publicly accessible) score may be kept by a designated scorekeeper or manually by each player (in the form of his/her own stack of chips). The player's own online score record could, in this variation, be less than that which is publicly visible (as surreptitiously represented by the player). The actual score although it is not verifiable by other players cannot be in any way modified or distorted in as much as the player must receive the questions, provide the answers, pay for supplementary assistance all on line. In this variation of play, the publicly represented score (e.g. chips which are accrued each time the player "claims" to have answered the question correctly on his/her smart device) remains the effective score of the player unless another player challenges that score by putting at risk some monetary value should the challenge (that a portion of the purported score is surreptitious) turns out to be incorrect. If, on the other hand, the challenge is correct, that portion of the player's score that is surreptitious is lost and a portion of it is credited to the successful challenger. Possibly an additional fine or penalty may be also levied against the remaining (legitimate) monetary value of the guilty player. The means by which a challenger may become "suspicious" of another player could be based upon either (a) instinct such as non-verbal clues, (b) the player's history of using surreptitious means to acquire monetary value (c) the player's ability to pay a fee to access the total (aggregate) amount of surreptitiously accrued monetary value across all current players.

Another variation of gameplay utilizing both mobile devices and the game board could allow screen sharing where one device is the "master" device and other linked smart devices are the "slave" devices. (Options for linking devices are discussed in more detail in the next section below.) All devices would show identical information on the screens so that all players could read the questions, verify correct answers, and see the additional information provided after the question was answered, which may include both text and multimedia files, including but not limited to videos, photos, and audio. (Note: the audio function could be limited to the "master" device, while corresponding video plays on all devices linked in the game.) In this way each player would have the option to see the questions and answers, but the designated reader would still be responsible for scanning cards, inputting information manually, and making other selections as necessary following the steps enumerated in FIGS. 8A-8E and previously discussed. The option to link devices and screen share in this manner would be inserted at player sign in step 806. Gameplay would follow the exemplary embodiment of game rules and software application functions. Smart device applications that can screen share or screencast, such as "Mobile Presenter™" already exist and would allow multiple devices to view the same screen while one device is used as the control. This could also be used in conjunction with a smart TV, where a user would control the software application from his/her smart device but the screencast software would allow all players to see presentation of the question and supplementary information on the big screen. This would be a very effective way to display multimedia information such as videos or images to enhance gameplay.

Additional variations from the exemplary embodiments would be possible by inserting various gameplay options at the user sign in step 804, including synching devices or playing independently of the game board. It would be possible to play a version of the game utilizing only the smart device software application 102 and not the game board. This would effectively make the application a "travel version" of the board game. Similar to the way users remotely play "Words with Friends" on their mobile devices, player's devices also could keep a list of their "friends", user names of contacts derived from social networking or manually inputted by player into the software application 102 for the possible purposes of keeping player rankings or for remotely playing multiplayer games without the game board. Players wishing to play together and use multiple smart devices simultaneously could optionally initiate a game remotely from a list of their "friends" who also have the smart device application 102 installed on their individual devices. This game could take various forms. A player would have the option to play a "solitaire" game, following the steps in FIGS. 8A-8E as described above or players could play on multiple devices in the same location or on multiple devices remotely. Players that are in the same location can link their smart devices via Bluetooth, Wi-Fi, or their mobile network utilizing the same functionality as an application such as "Bump" or by manually linking up. A "Bump" could link devices, initiate a game, or share settings. If players are remote, they can utilize the mobile network or Wi-Fi to play a multi-player game. Possible scoring variations, which could be indicated at player sign in at 806, include where players are only able to see their own score and may wager on the outcome or call each other's "bluff" for a chance to earn additional points where players may enter a fake score to be viewed publicly but maintain their actual score privately, or where the game would display all scores accurately for all players to access during the game. The game could continue until the player reached a certain number of questions or points. End scores could be compared to other players' rankings in their "friends" circle. Additionally, game play could be turn based, where players take turns with their different individual questions generated randomly from database 104, or where all players receive the same question simultaneously and must "buzz in" first for an opportunity to answer the question. This iteration is discussed in more detail below.

The following describes an additional variation of game play in which steps 840-858 are synchronized across all participating players (similar application-wise to that of a multi-user screen share application). The difference in this variation is that all players receive to their smart devices the matching question from the database simultaneously and all participating players' smart devices are operating synchronously by following the same information flow pathway. Players would indicate this gameplay option at the user sign-in/game options selection step 804. The players' smart devices could be linked via Bluetooth or Wi-Fi utilizing an application such as "Bump" or by manually linking up. The diversion occurs where among participants viewing the question only the player who elicits knowledge of the answer by pressing the answer button on the smart device touch screen is given the opportunity to answer the question, like "buzzing in" first on a game show. This diverges from the steps in FIGS. 8A-8E in that it skips steps 878-884, as the option for assistance is removed. If the player answers the question correctly, that player exclusively receives the point value for the question on his/her player score. All players who did not get to answer the question will follow the path at 898 for "incorrect answer" and a correct answer is presented on their screens. This score is updated and if a question level score is maintained in the database 104 also the single question level score is added to the user ID table entry. If the first player to hit the answer button answers the question incorrectly or does not answer the question within the allotted time limit, the opportunity is again opened up to the other players to answer the question or for that (next) player that hits the answer button first. This question answering opportunity would typically exclude the first player who was not able to provide the correct answer according to the rules of the game. If the player answers incorrectly, that player loses points consistent with the point value of the question. If the player answers correctly, that player gains points. Debiting of points could vary by difficulty of question as noted above. Players would continue playing up to a certain point level or number of rounds. The high score would win the game and gameplay would end.

Other Question Reading and Answer Checking Consideration for how to Seamlessly Supplement Primary Off-Line Game Play with the Software Application In another variation, the player may simply want to see the question in written form forgoing inputting/checking the correctness of an answer or getting the correct one. Of course, any number of variations of reading the answer, answering it, and verifying its correctness may be possible. Any preferred implementation is for illustration purposes only. For example, inasmuch as the exemplary embodiments enable the player to have the card read to him/her by another player, the player could have the question read to him/her by that player and the other player then hand the first player answering the question the card for purposes of being able to read it directly his/herself (for example, without looking at the inside of the question card where the answer may be provided). Notwithstanding the above, in order for the player to view the question from one of the game cards on his/her smart device absent the question card typically the question identifier is first inputted in the form of the question cards' QR code or via an alphanumeric version of the code which is printed on the card and which the player enters into the smart device or tablet computer. In this case, the QR code may be scanned off of the card by the player (with answer on the inside of the card or otherwise inaccessible) or it may be scanned by the other player delegated to read the question. The player could also, if desired, answer the question as presented via the smart device or tablet computer to determine the answer him/herself and/or to verify the voracity of the other players' response to the player's answer (whether correct or incorrect) as purported by the other player (or to simply determine the correctness of his response and/or the correct response thereto him/herself).

Those skilled in the art will appreciate that incorporation of the software application 102 into game play opens up many game play options. Conceivably, slight variations to the application could give players additional game play options. A player could choose to play solitaire, multi-player on a single device (as in the exemplary embodiment), or multi-player with multiple devices by linking their smart devices via Bluetooth, Wi-Fi, or over the cellular network. This would make a "travel version" of the game possible; players could play without the board and/or from different locations simultaneously. Multi-player/multi-device games could be turn-based or synchronous, where players would see the same question simultaneously and "buzz in" first to answer. In another variation, the devices could have a master/slave screen sharing relationship where the "master" device acts as a control and all other linked devices display a screencast of the "master". This could be used in conjunction with the board game to display questions, supplementary information, and multimedia content on a big screen smart TV. In variations where the software application 102 is used to maintain score, this score could be kept privately, publicly, or players could display a false score publicly while maintaining an accurate score privately. Variations on scorekeeping would allow players to wager on the game outcome or call each other's "bluff" for a chance to earn additional points. These variations would largely follow FIGS. 8A-8D, diverging only in user or player setting at sign in and in whether players would have access to supplementary information. These games would end after a certain number of rounds or when a certain point score is reached.

Those skilled in the art will also appreciate that the invention may be applied to other applications and may be modified without departing from the scope of the invention. Accordingly, the scope of the invention is not intended to be limited to the exemplary embodiments described above, but only by the appended claims.

What is claimed:

1. A board game that facilitates learning about a culture, comprising:
    a physical game board that provides game spaces for selecting questions about different aspects of the culture and a navigational or trade route through the game spaces;
    game cards that provide questions and proposed answers regarding said different aspects of the culture, at least some of said game cards having a QR code; and
    a mobile computing device including a QR code reader adapted to scan a QR code of a selected game card to retrieve a question corresponding to the QR code, and software that adapts the mobile computing device to audibilize or display retrieved questions, accept a player's response, determine whether the player's response is correct, provide supplementary information about the question and/or the player's response at a player's request, and provide tips or clues to the player upon request.

2. A board game as in claim 1, wherein each game card represents an aspect of the culture.

3. A board game as in claim 1, wherein the culture is Chinese, the game board includes an artistic rendering of China, and the game spaces advance along an artistic depiction of the ancient Silk Route through China.

4. A board game as in claim 3, wherein the different aspects of the Chinese culture correspond to the five elements of wood, metal, earth, fire, and water.

5. A board game as in claim 4, wherein a card depicting the element wood includes questions about modern history and politics; a card depicting the element metal includes questions about business and economics; a card depicting the element earth includes questions about at least one of topography, geography, terrain, natural resources, infrastructure, and biodiversity; a card depicting the element fire includes questions about modern politics, foreign policy, and military; and a card depicting the element water includes questions about religion and philosophy.

6. A board game that facilitates learning about a culture, comprising:
    a physical game board that provides game spaces for selecting questions about different aspects of the culture and a navigational or trade route through the game spaces;
    game cards that provide questions and proposed answers regarding said different aspects of the culture;
    a mobile computing device including software that adapts the mobile computing device to scan a selected game card or to receive an alphanumeric question identifier from a player for the selected game card, audibilize or display the questions, accept a player's response, determine whether the player's response is correct, provide supplementary information about the question and/or the player's response at a player's request, and provide tips or clues to the player upon request; and
    fingercuffs that a player wears when the player loses his/her turn.

7. A board game as in claim 1, wherein the game cards further include wild cards that cause a player to perform specific actions or to compete against another player in a competitive task.

8. A board game as in claim 1, wherein the game cards include different sets of questions for different age groups and/or skill levels of players.

9. A board game as in claim 1, wherein the game cards include questions directed to at least one of business, economics, history, military, foreign policy, geography, biodiversity, religion and culture of peoples living along the navigational or trade route depicted on the game board.

10. A board game as in claim 1, wherein the mobile computing device includes a player input device that a player uses to input an alphanumeric question identifier for the selected game card into the mobile computing device and the software audibilizes the question corresponding to the inputted question identifier.

11. A board game as in claim 1, wherein the mobile computing device includes a player input device that a player uses to input an answer to a question, and the software compares the inputted answer to answers in a database and provides the player with an indication as to whether the answer is correct or incorrect.

12. A board game as in claim 1, wherein the mobile computing device includes a player input device that a player uses to request assistance in responding to a question, and the software provides the supplementary information, tips, and/or clues in response.

13. A board game as in claim 1, wherein the software accesses the Internet to search for and to provide said supplementary information.

14. A board game as in claim 1, wherein the software provides a pronunciation aid for words used on the game cards or on the game board.

15. A board game as in claim 1, further comprising a mobile computing device for each player, whereby the players' mobile computing devices are synchronized for simultaneous game play.

16. A board game as in claim 15, wherein the synchronized mobile computing devices display the same information simultaneously to each player.

17. A board game as in claim 15, wherein the synchronized mobile computing devices identify which player was the first to answer a question.

18. A board game as in claim 17, wherein the synchronized mobile computing devices enable other players to answer the question if the first player to answer the question was incorrect.

19. A board game as in claim 15, wherein the synchronized mobile computing devices enable one player to bribe another player to provide assistance with a question in return for points within the game.

* * * * *